United States Patent
Kato et al.

(10) Patent No.: US 11,840,232 B2
(45) Date of Patent: Dec. 12, 2023

(54) DRIVING ASSISTANCE DEVICE

(71) Applicant: DENSO CORPORATION, Kariya (JP)

(72) Inventors: Kenji Kato, Kariya (JP); Satoru Noro, Kariya (JP)

(73) Assignee: DENSO CORPORATION, Kariya (JP)

( * ) Notice: Subject to any disclaimer, the term of this patent is extended or adjusted under 35 U.S.C. 154(b) by 440 days.

(21) Appl. No.: 16/914,021

(22) Filed: Jun. 26, 2020

(65) Prior Publication Data

US 2020/0324777 A1 Oct. 15, 2020

Related U.S. Application Data

(63) Continuation of application No. PCT/JP2018/040268, filed on Oct. 30, 2018.

(30) Foreign Application Priority Data

Dec. 28, 2017 (JP) ................. 2017-253404

(51) Int. Cl.
- *B60W 30/18* (2012.01)
- *B60W 40/105* (2012.01)
- *G06V 20/56* (2022.01)

(52) U.S. Cl.
CPC .... *B60W 30/18163* (2013.01); *B60W 40/105* (2013.01); *G06V 20/588* (2022.01); *B60W 2520/10* (2013.01); *B60W 2554/4041* (2020.02)

(58) Field of Classification Search
CPC ......... B60W 30/18163; B60W 40/105; B60W 2520/10; B60W 2554/4041; G06V 20/588
See application file for complete search history.

(56) References Cited

U.S. PATENT DOCUMENTS

| | | | |
|---|---|---|---|
| 2016/0185388 A1* | 6/2016 | Sim .................. | B60W 10/04 701/41 |
| 2016/0225261 A1* | 8/2016 | Matsumoto ........ | B62D 15/0255 |
| 2018/0086338 A1* | 3/2018 | Yamada .............. | B60W 10/04 |

* cited by examiner

*Primary Examiner* — Kenneth J Malkowski
(74) *Attorney, Agent, or Firm* — MASCHOFF BRENNAN

(57) ABSTRACT

A driving assistance device includes a lane change detection unit, a lane identification unit, a first space determination unit, an operation control unit. The lane identification unit identifies an original lane and a destination lane by using a detection result obtained by a boundary detection unit that detects a first boundary and a second boundary. The first boundary is a boundary between the original lane and the destination lane, and the second boundary is a boundary that defines the original lane and is located on a side opposite to the first boundary. When it is detected that the own vehicle is scheduled to perform a lane change and it is determined that the passable space is present, the operation control unit causes the own vehicle to perform a lateral movement operation before the lane change is performed. The lateral movement operation causes the own vehicle to approach the destination lane.

12 Claims, 21 Drawing Sheets

SECOND EMBODIMENT

FOURTH EMBODIMENT

FIFTH EMBODIMENT

SIXTH EMBODIMENT

[OBJECT VEHICLE IS PRESENT]

SIXTH EMBODIMENT

SEVENTH EMBODIMENT

EIGHTH EMBODIMENT

DRIVING ASSISTANCE DEVICE

CROSS-REFERENCE TO RELATED APPLICATION

The present application is a continuation application of International Application No. PCT/JP2018/040268, filed on Oct. 30, 2018, which claims priority to Japanese Patent Application No. 2017-253404, filed on Dec. 28, 2017. The contents of these applications are incorporated herein by reference in their entirety.

BACKGROUND

Technical Field

The present disclosure relates to driving assistance of a vehicle when the vehicle changes lanes.

Background Art

As driving assistance devices for assisting driving of a vehicle, various devices have been proposed to assist an operation of changing lanes (hereinafter referred to as "lane change") during driving of the own vehicle. For example, in the prior art, a driving assistance device performs driving assistance according to a driver's intention regarding promptness of a lane change by setting a target path of the own vehicle to be a shorter path as a shorter time is required from when the lane change is started by turning on a turn signal to when the own vehicle moves a predetermined distance in a lateral direction (width direction) in a lane in which the own vehicle is currently traveling.

SUMMARY

In the present disclosure, provided is a driving assistance device as the following. The driving assistance device is configured to be mounted on an own vehicle. The driving assistance device includes: a lane identification unit that identifies an original lane and a destination lane by using a detection result obtained by a boundary detection unit that is mounted on the own vehicle and detects a first boundary and a second boundary, the original lane being a lane in which the own vehicle travels before the lane change is performed, the destination lane being a lane in which the own vehicle is scheduled to travel after the lane change is performed, the first boundary being a boundary between the original lane and the destination lane, the second boundary being a boundary that defines the original lane and is located on a side opposite to the first boundary; a first space determination unit that determines, by using a detection result obtained by an object detection unit, whether a passable space is present beside the the destination lane with respect to a position of the own vehicle in the original lane, the object detection unit being mounted on the own vehicle and detecting at least a position and a size of an object that is present around the own vehicle, the passable space being a space through which a moving object is passable, the passable space including a space between the own vehicle and an object vehicle traveling in the destination lane and; and an operation control unit that when it is detected that own vehicle is scheduled to perform a lane change and it is determined that the passable space is present, causes the own vehicle to perform a lateral movement operation before the lane change is performed, the lateral movement operation causing the own vehicle to approach the destination lane.

BRIEF DESCRIPTION OF THE DRAWINGS

The above object and other objects, features, and advantages of the present disclosure will be more clarified by the following detailed description with reference to the accompanying drawings, wherein.

DETAILED DESCRIPTION OF THE PREFERRED EMBODIMENTS

[PTL 1] JP 6137212 B

During a lane change, in some cases, a moving object such as a motorcycle or a bicycle passes through a space between the own vehicle and an object vehicle traveling in a destination lane. In particular, when the vehicles are traveling at a low speed due to a traffic jam or the like, the moving object is more likely to pass through the space. In the driving assistance device of Patent Literature 1, such a moving object passing through the space during the lane change is not sufficiently considered. Thus, a technique for preventing a moving object from passing through a space between the own vehicle and an object vehicle during a lane change has been desired.

The present disclosure has been made to solve at least some of the above problems, and can be implemented as the following embodiment.

According to the driving assistance device of the embodiment, when it is detected that the own vehicle is scheduled to perform a lane change and it is determined that a passable space is present, before the lane change is performed, the own vehicle is controlled to perform the lateral movement operation which causes the own vehicle to approach the destination lane. Therefore, it is possible to prevent a driver of a moving object from performing a passing operation, thereby preventing the moving object from passing through a space between the own vehicle and an object vehicle during the lane change.

The present disclosure can also be implemented in various forms other than the driving assistance device. For example, the present disclosure can be implemented in a form such as a vehicle including the driving assistance device, a driving assistance method, a lane change method, a computer program for implementing the device and the methods, or a storage medium storing the computer program.

A. First Embodiment

A1. Device Configuration

Figure 1:
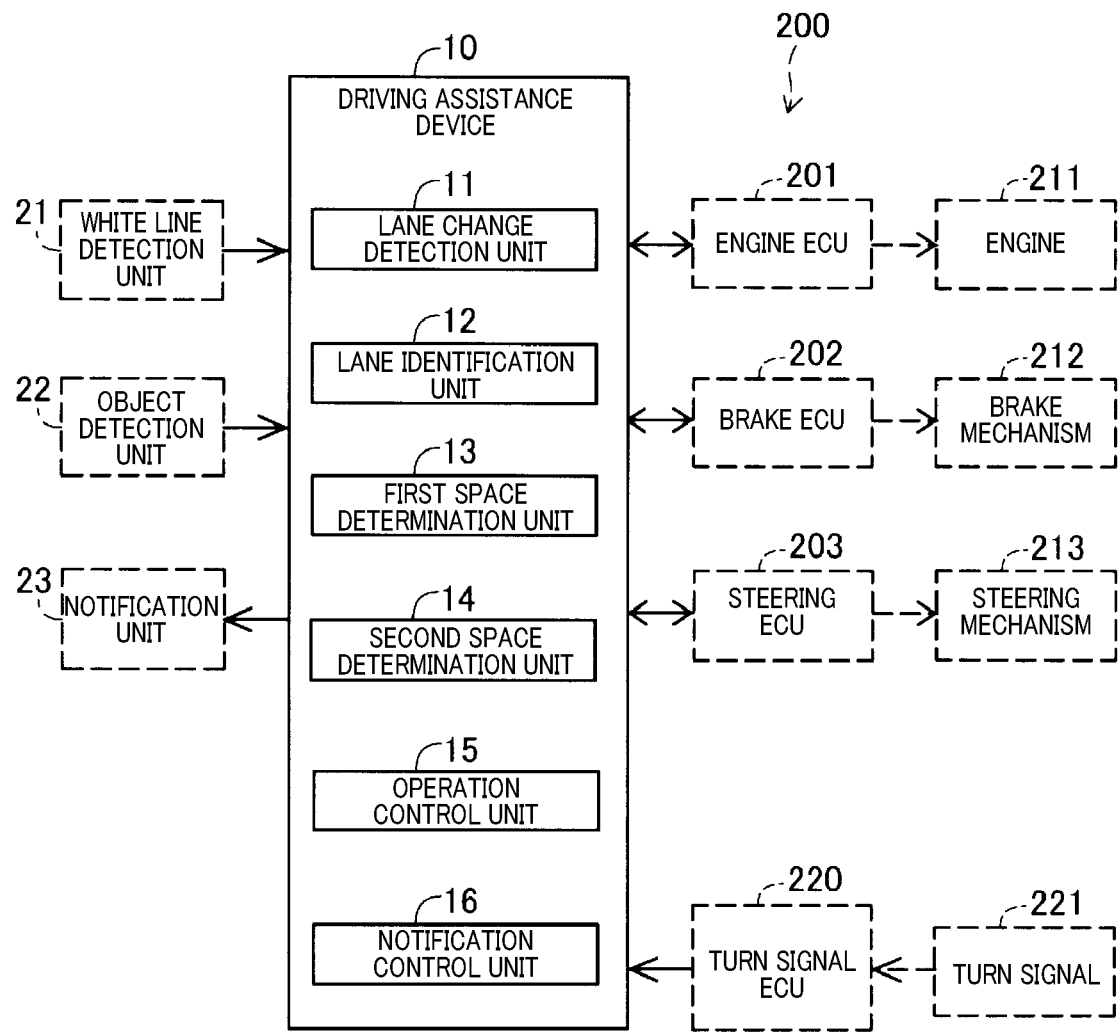
FIG. 1 is a block diagram showing a schematic configuration of a driving assistance device of the present disclosure.

A driving assistance device 10 of a first embodiment shown in FIG. 1 is mounted on a vehicle and assists driving of the vehicle during a lane change. In the present embodiment, a vehicle equipped with the driving assistance device 10 is also referred to as "own vehicle". The "assist of driving" means that engine control, brake control, and steering control of the own vehicle are automatically performed in place of a driver or such control is performed to assist control performed by the driver. The case where "such control is performed to assist control performed by the driver" corresponds to, for example, when the driver performs an operation of turning on a right turn signal (turn signal 221 (described later)) to perform a lane change while the own vehicle is traveling straight, engine control, brake control, and steering control are automatically performed so that the own vehicle is moved to the right side. The driving assistance device 10 may assist driving of the own vehicle not only during a lane change but also in any other situation while the own vehicle is traveling. In the present embodiment, the driving assistance device 10 is composed of an ECU (Electronic Control Unit) including a microcomputer and a memory.

The driving assistance device 10 is electrically connected to each of a white line detection unit 21, an object detection unit 22, a notification unit 23, an operation control device 200, and a turn signal ECU 220, and the device communicates with these functional units. In the present embodiment, the communication is performed through a Controller Area Network (CAN). Instead of the CAN, any vehicle-mountable network such as FlexRay or Ethernet may be used to perform the communication.

The white line detection unit 21 detects a white line that serves as a boundary in a width direction of a lane in which the own vehicle travels. Specifically, the white line detection unit 21 detects a white line (hereinafter referred to as "first white line") that serves as a boundary between a lane (hereinafter referred to as "original lane") in which the own vehicle travels before the lane change is performed and a lane (hereinafter referred to as "destination lane") in which the own vehicle is scheduled to travel after the lane change is performed. The white line detection unit 21 also detects a white line (hereinafter referred to as "second white line") that defines the original lane and is located on a side opposite to the first white line. The white line detection is performed by a known method using a captured image obtained by a camera mounted on the own vehicle.

The object detection unit 22 performs sensing around the own vehicle, and detects at least a position and a size of an object that is present around the own vehicle. The object detection is performed by a known method using a captured image obtained by the camera mounted on the own vehicle and using a target which is a set of detection points detected by a sensor such as a millimeter wave radar or a LiDAR (Light Detection And Ranging or Laser Imaging Detection And Ranging) sensor mounted on the own vehicle.

The notification unit 23 provides a notification to the driver of the own vehicle. In the present embodiment, the notification unit 23 includes a monitor display and a speaker.

The operation control device 200 controls an operation of the own vehicle. The operation control device 200 includes an engine ECU 201, a brake ECU 202, and a steering ECU 203. The engine ECU 201 controls an operation of an engine 211 of the own vehicle. Specifically, the engine ECU 201 controls various actuators (not shown) to control an opening/closing operation of a throttle valve, an ignition operation of an igniter, an opening/closing operation of an intake valve, and the like. The brake ECU 202 controls a brake mechanism 212. The brake mechanism 212 is composed of a group of devices (actuators) related to brake control such as a sensor, a motor, a valve, and a pump. The brake ECU 202 determines a timing at which the brake is applied and the amount of braking, and controls the devices constituting the brake mechanism 212 so that the determined amount of braking is obtained at the determined timing. The steering ECU 203 controls a steering mechanism 213. The steering mechanism 213 is composed of a group of devices (actuators) related to steering such as a power steering motor. The steering ECU 203 determines the amount of steering (steering angle) on the basis of measurement values obtained from a yaw rate sensor and a steering angle sensor mounted on the own vehicle, and controls the devices constituting the steering mechanism 213 so that the determined amount of steering is obtained.

The turn signal ECU 220 controls an operation of the turn signal 221, i.e., turning on and off of the turn signal 221. Furthermore, the turn signal ECU 220 informs the driving assistance device 10 about an operation state, i.e., an ON state or an OFF state of the turn signal 221.

The driving assistance device 10 includes a lane change detection unit 11, a lane identification unit 12, a first space determination unit 13, a second space determination unit 14, an operation control unit 15, and a notification control unit 16. These functional units 11 to 16 are each implemented by the microcomputer (not shown) of the driving assistance device 10 executing a control program stored in advance in a storage unit (not shown) of the driving assistance device 10.

The lane change detection unit 11 detects that the own vehicle is scheduled to perform a lane change. In the present embodiment, when the operation state of the turn signal 221 informed from the turn signal ECU 220 is changed from the OFF state to the ON state, the lane change detection unit 11 detects that the own vehicle is scheduled to perform a lane change.

The lane identification unit 12 identifies the original lane and the destination lane by using a white line detection result obtained by the white line detection unit 21. Specifically, the lane identification unit 12 identifies a position and a width of each of the original lane and the destination lane.

The first space determination unit 13 determines, by using a detection result obtained by the object detection unit 22, whether there is a space (hereinafter referred to as "passable space") that includes a space between the own vehicle and an object vehicle traveling in the destination lane and through which a moving object is passable. The "moving object" corresponds to, for example, a motorcycle, a bicycle, or the like.

The second space determination unit 14 determines, by using a detection result obtained by the object detection unit 22, whether a movement candidate space of a predetermined size or more is present on the destination lane side when viewed from the own vehicle. The movement candidate space means a candidate space to which the own vehicle is to be moved in a lane change. In the present embodiment, the movement candidate space is a space that has a rectangular shape in plan view and has a length in the width direction twice the width of the own vehicle and a length in the direction of travel 1.5 times the length of the own vehicle. The movement candidate space may have any size large enough to accommodate at least the own vehicle.

The operation control unit 15 controls the operation control device 200 to cause the own vehicle to perform an operation in which the own vehicle approaches the destination lane (hereinafter referred to as "lateral movement operation"). Details of the lateral movement operation and details of the timing at which the lateral movement operation is performed and the like will be described later. The notification control unit 16 controls the notification unit 23 to provide a notification.

The driving assistance device 10 having the above configuration performs a driving assistance process (described later), thereby preventing a moving object from passing through a space between the own vehicle and an object vehicle during a lane change.

A2. Driving Assistance Process

Figure 2:
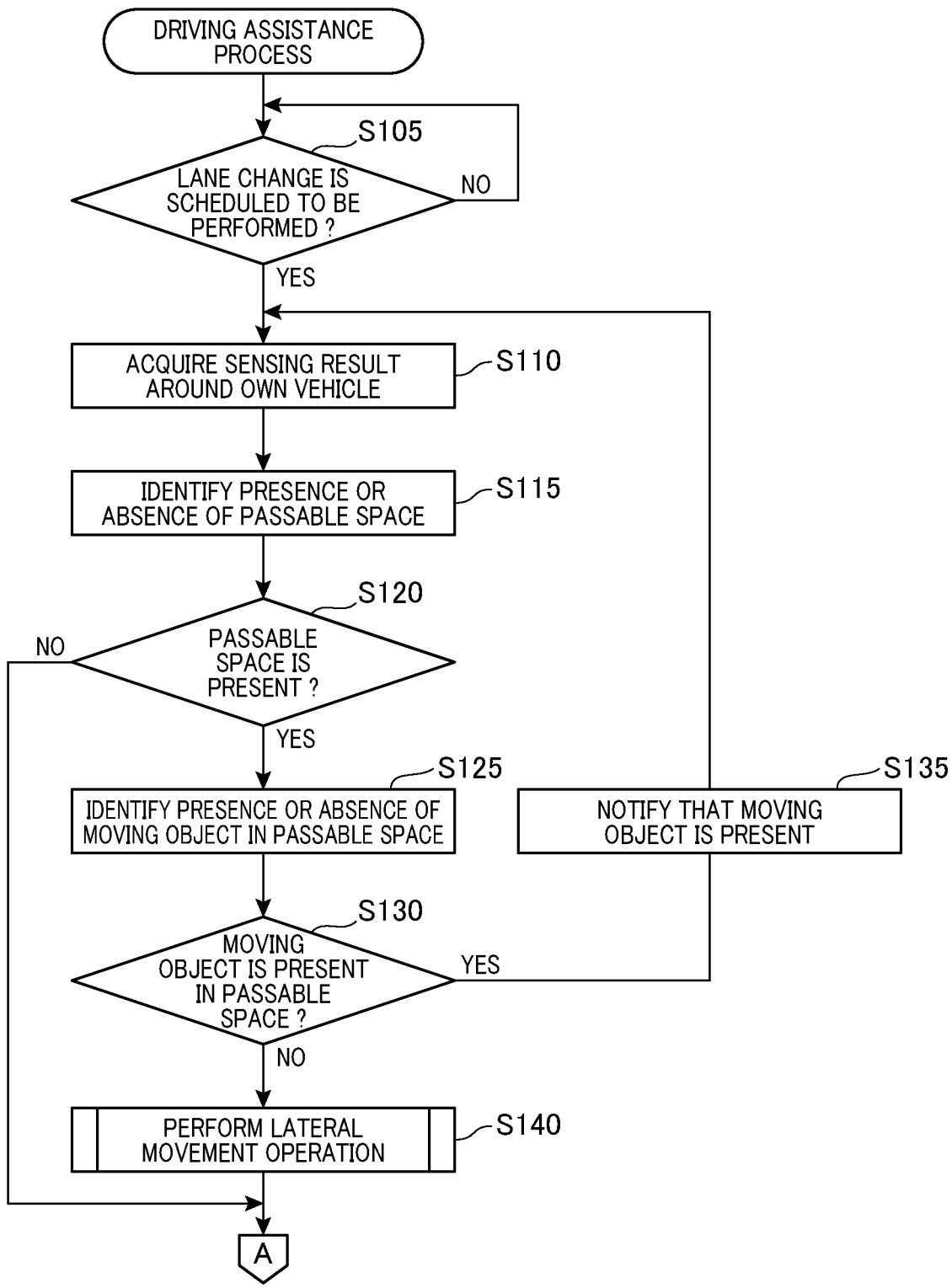
FIG. 2 is a flow chart showing a procedure of a driving assistance process of a first embodiment.

When an ignition of the own vehicle is turned on, the driving assistance device 10 performs the driving assistance process. As shown in FIG. 2, on the basis of the operation state of the turn signal 221 informed from the turn signal ECU 220, the lane change detection unit 11 determines whether the own vehicle is scheduled to perform a lane change (step S105). When it is determined that the own vehicle VL1 is not scheduled to perform a lane change (NO at step S105), step S105 is performed again.

When it is determined that the own vehicle is scheduled to perform a lane change (YES at step S105), the first space determination unit 13 acquires a sensing result around the own vehicle obtained by the object detection unit 22 (step S110). On the basis of the sensing result acquired at step S110, and the original lane and the destination lane identified by the lane identification unit 12, the first space determination unit 13 identifies the presence or absence of a passable space (step S115), and determines the presence or absence of a passable space (step S120).

Figure 4:
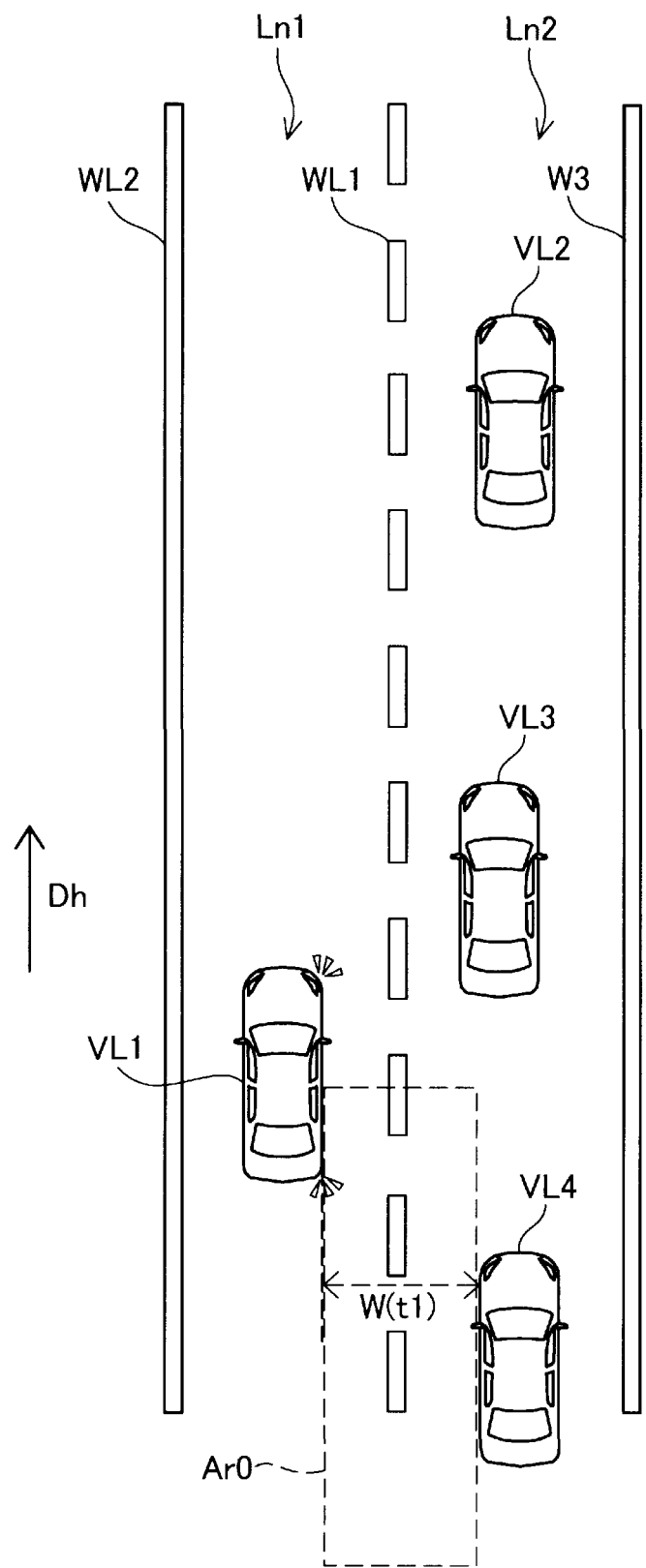
FIG. 4 is an explanatory diagram showing an example of a passable space of the first embodiment.

As shown in FIG. 4, while an own vehicle VL1 is traveling straight in a direction Dh in a lane Ln1, in a lane Ln2 on the right side of the lane Ln1, three object vehicles VL2, VL3, and VL4 are traveling in the direction Dh. A lane change from the lane Ln1 to the lane Ln2 is to be performed by the own vehicle VL1, and thus a right side turn signal of the own vehicle VL1 is on to indicate that the own vehicle VL1 is turning right. In this example, the lane Ln1 corresponds to the original lane and the lane Ln2 corresponds to the destination lane. The lane Ln1 is bounded by a first white line WL1 and a second white line WL2. The lane Ln2 is bounded by the first white line WL1 and a third white line WL3. The first white line WL1 is a boundary between the original lane (lane Ln1) and the destination lane (lane Ln2). The second white line WL2 is a boundary between a roadway and a sidewalk. The third white line WL3 is a boundary between the lane Ln2 and an opposite lane (not shown).

In the present embodiment, the passable space is a space that includes a space between the own vehicle VL1 and an object vehicle that is present behind the own vehicle VL1 at a position within a predetermined distance from the own vehicle VL1 in the destination lane. In the passable space, an interval W in a direction orthogonal to the direction Dh (hereinafter referred to as "intersecting direction") is a predetermined threshold distance or more. In the example shown in FIG. 4, at time t1, an interval W (t1) in the intersecting direction between the own vehicle VL1 and an object vehicle VL4 which is a vehicle traveling behind the own vehicle VL1 is the predetermined threshold distance or more, and thus a space Ar0 corresponds to the passable space. In the present embodiment, the passable space is a strip-shaped space that has an apex at a center in a vehicle longitudinal direction of the own vehicle VL1, has a width which is the interval W (W(t1)), and extends for a predetermined length backward from the own vehicle VL1. In the present embodiment, the predetermined threshold distance is set to 1 m (meter). However, the predetermined threshold distance is not limited to 1 m, and may be set to any length that allows a moving object to pass through the passable space. In the present embodiment, the predetermined length is set to 20 m. However, the predetermined length is not limited to 20 m, and may be set to any length. In the present embodiment, the interval W means an interval W in the intersecting direction between the own vehicle VL1 and an object vehicle that is present behind the own vehicle VL1 and is closest to the own vehicle VL1. When a plurality of object vehicles are present behind the own vehicle VL1, the interval W may be an average of the lengths in the intersecting direction between the own vehicle VL1 and the vehicles. When no object vehicle is present behind the own vehicle VL1, the interval W may be set assuming that, in a center of the destination lane, a virtual vehicle having a predetermined width is traveling in the direction Dh at a predetermined distance away from the own vehicle VL1, and the interval W may be set to a length in the intersecting direction between such a virtual vehicle and the own vehicle VL1.

As shown in FIG. 2, when it is determined that a passable space is present (YES at step S120), on the basis of the sensing result obtained by the object detection unit 22, the operation control unit 15 identifies the presence or absence of a moving object in the passable space (step S125), and determines whether a moving object is present (step S130). The operation control unit 15 may determine the presence or absence of a moving object in the passable space, for example, on the basis of information such as a type of the moving object, a width of the moving object, and a relative speed (including a direction and a magnitude of the speed) of the moving object with respect to the own vehicle VL1.

Figure 5:
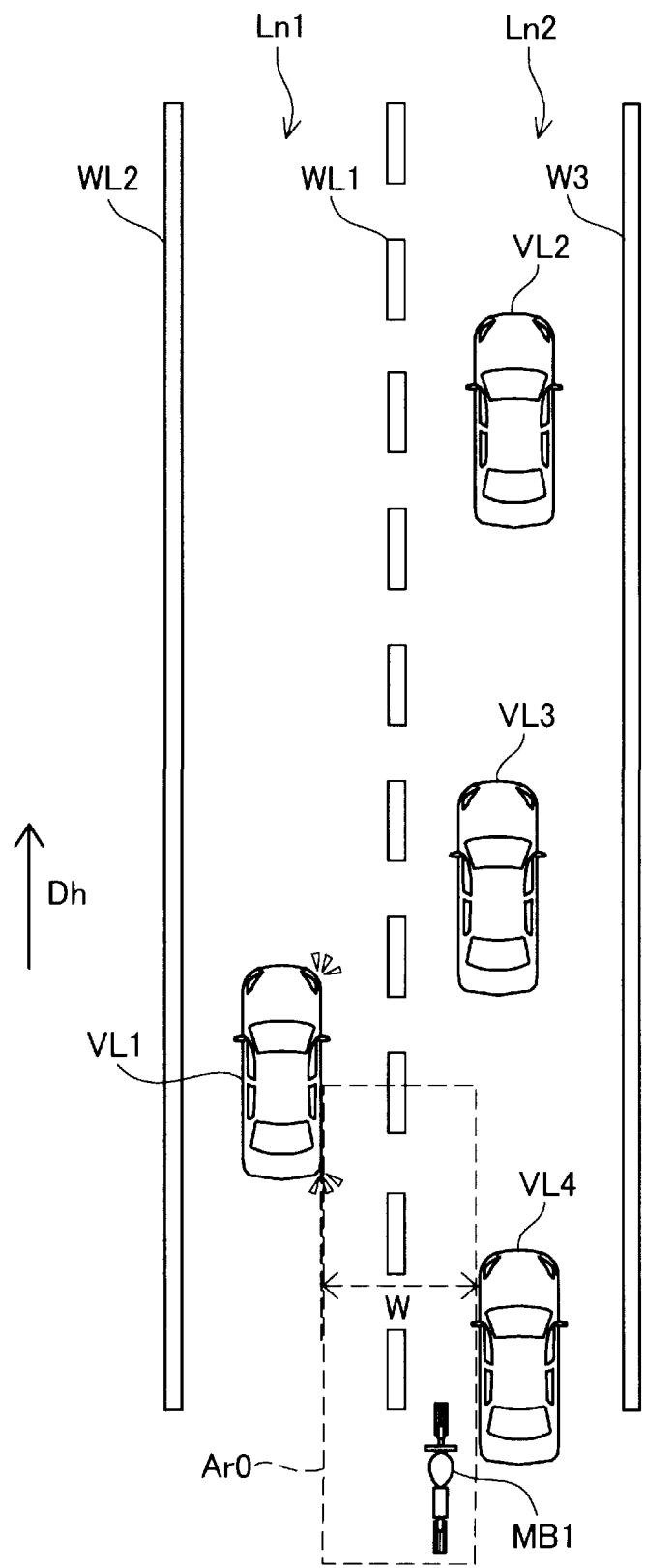
FIG. 5 is an explanatory diagram showing an example of a moving object that travels in the passable space.

In an example shown in FIG. 5, a moving object MB1 is traveling in the direction Dh in the passable space Ar0. Thus, when it is determined that the moving object MB1 is present in the passable space (YES at step S130), as shown in FIG. 2, the notification control unit 16 causes the notification unit 23 to notify that the moving object MB1 is present in the passable space (step S135). After step S135, control returns to step S110 described above. In the present embodiment, the notification at step S135 is provided by displaying a warning message on the monitor display constituting the notification unit 23 and outputting a predetermined warning sound from the speaker. The notification unit 23 may perform only one of the display of the warning message and the output of the warning sound.

At step S130 described above, when it is determined that no moving object is present in the passable space (NO at step S130), the operation control unit 15 controls the operation control device 200 to cause the own vehicle VL1 to perform a lateral movement operation (step S140).

Figure 6:
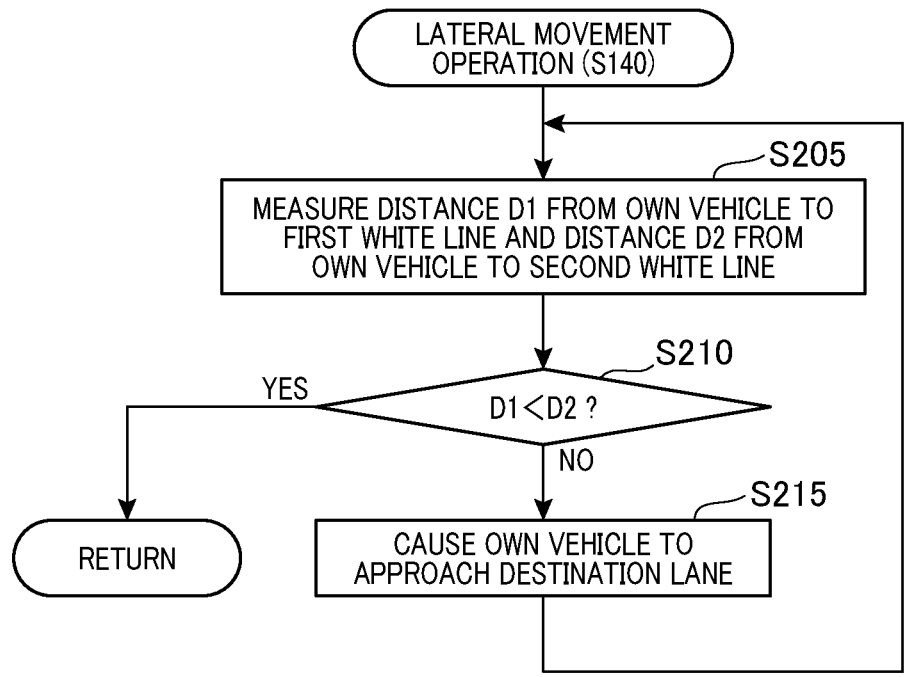
FIG. 6 is a flow chart showing a procedure of a lateral movement operation of the first embodiment.

As shown in FIG. 6, in the lateral movement operation, first, on the basis of the white line detection result obtained by the white line detection unit 21 and a position and a size of the own vehicle VL1, the operation control unit 15 measures a distance D1 from the own vehicle VL1 to the first white line WL1 and a distance D2 from the own vehicle VL1 to the second white line WL2 (step S205). The operation control unit 15 determines whether the distance D1 is smaller than the distance D2 (step S210), and when it is determined that the distance D1 is not smaller than the distance D2 (NO at step S210), the operation control unit 15 controls the operation control device 200 so that the own vehicle VL1 approaches the destination lane Ln2 (step S215). After step S215, control returns to step S205. When it is determined that the distance D1 is smaller than the distance D2 (YES at step S210), the lateral movement operation is ended, and step S145 shown in FIG. 3 is performed.

Figure 7:
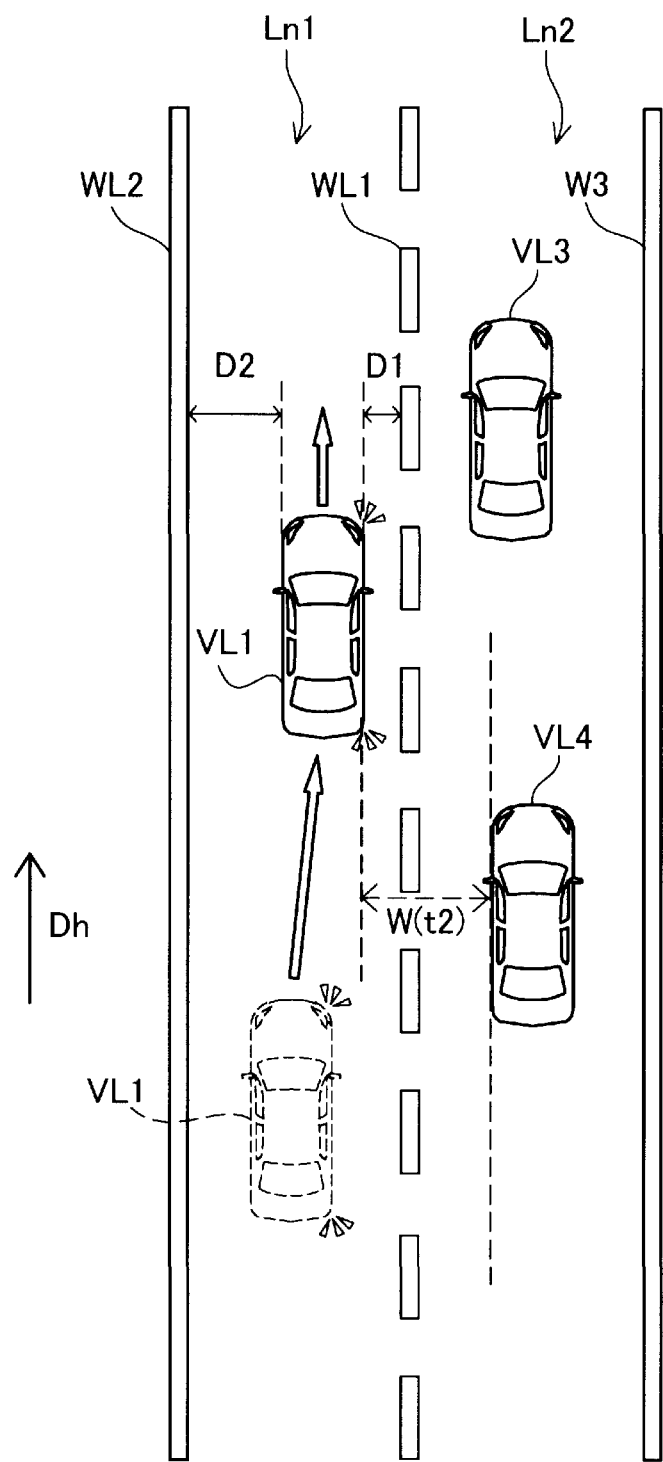
FIG. 7 is an explanatory diagram showing an example of the lateral movement operation of the first embodiment.

As shown in FIG. 7, when the own vehicle VL1 in the situation shown in FIG. 4 performs the lateral movement operation (step S140), at time t2, when the own vehicle VL1 approaches the lane Ln2 and the distance D1 becomes smaller than the distance D2, the own vehicle VL1 travels straight in the direction Dh so that a position in the width direction is maintained. At this time, an interval W (t2) between the own vehicle VL1 and the object vehicle VL4 in the intersecting direction is smaller than the interval W (t1) shown in FIG. 4.

Figure 3:
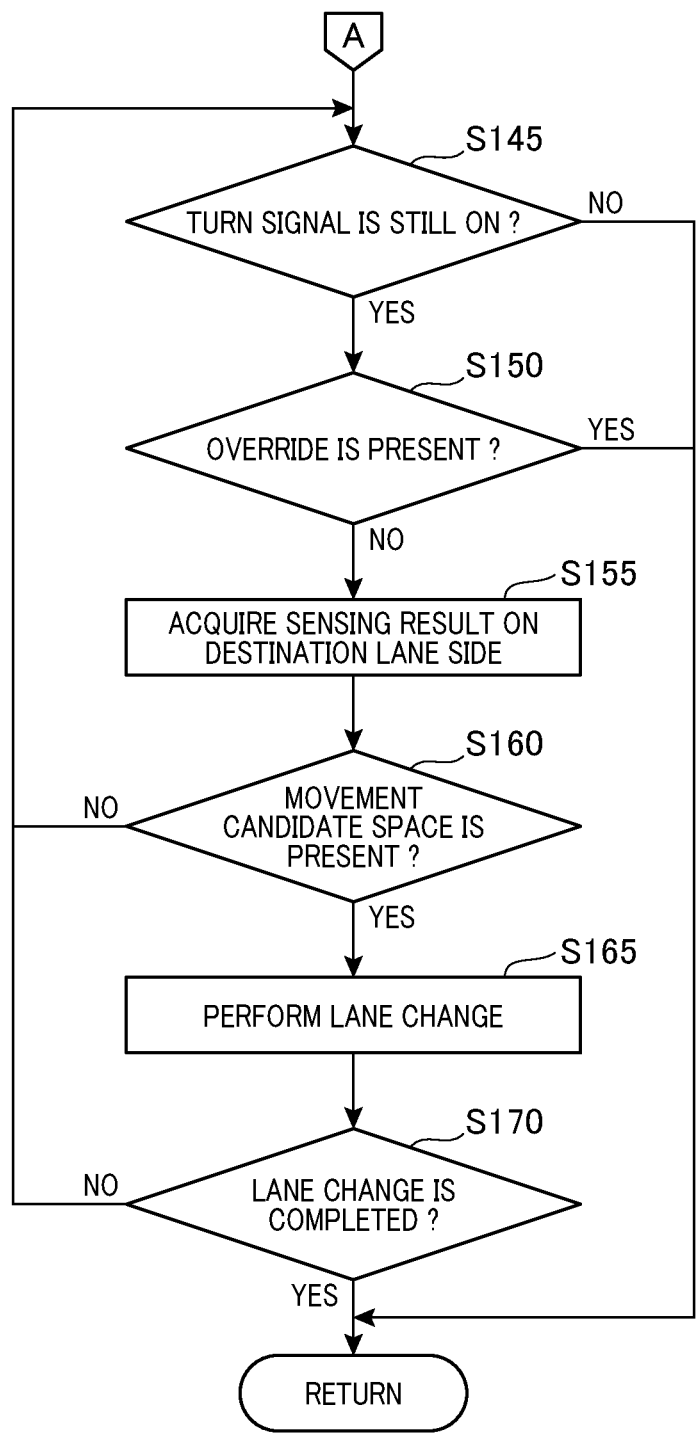
FIG. 3 is a flow chart showing a procedure of the driving assistance process of the first embodiment.

After the lateral movement operation described above (step S140) is performed, or when it is determined at step S120 described above that no passable space is present (NO at step S120), as shown in FIG. 3, on the basis of the information from the turn signal ECU 220, the operation control unit 15 determines whether the turn signal 221 is still in the ON state (step S145). When it is determined that the turn signal 221 is not still in the ON state (NO at step S145), control returns to step S105 described above. When the turn signal 221 is not still in the ON state, the driver presumably no longer intends to perform a lane change, and thus a lane change operation (step S165 described later) is not performed.

On the other hand, when it is determined that the turn signal 221 is still in the ON state (YES at step S145), the operation control unit 15 determines whether an override by the driver is present (step S150). The override means a brake operation, an accelerator operation, or the like performed by the driver during automatic driving. When it is determined that the override by the driver is present (YES at step S150), control returns to step S105 described above. When the override is present, the driver presumably intends to cancel the automatic driving (automatic lane change) by the driving assistance process, and thus the lane change operation (step S165 described later) is not performed.

Figure 8:
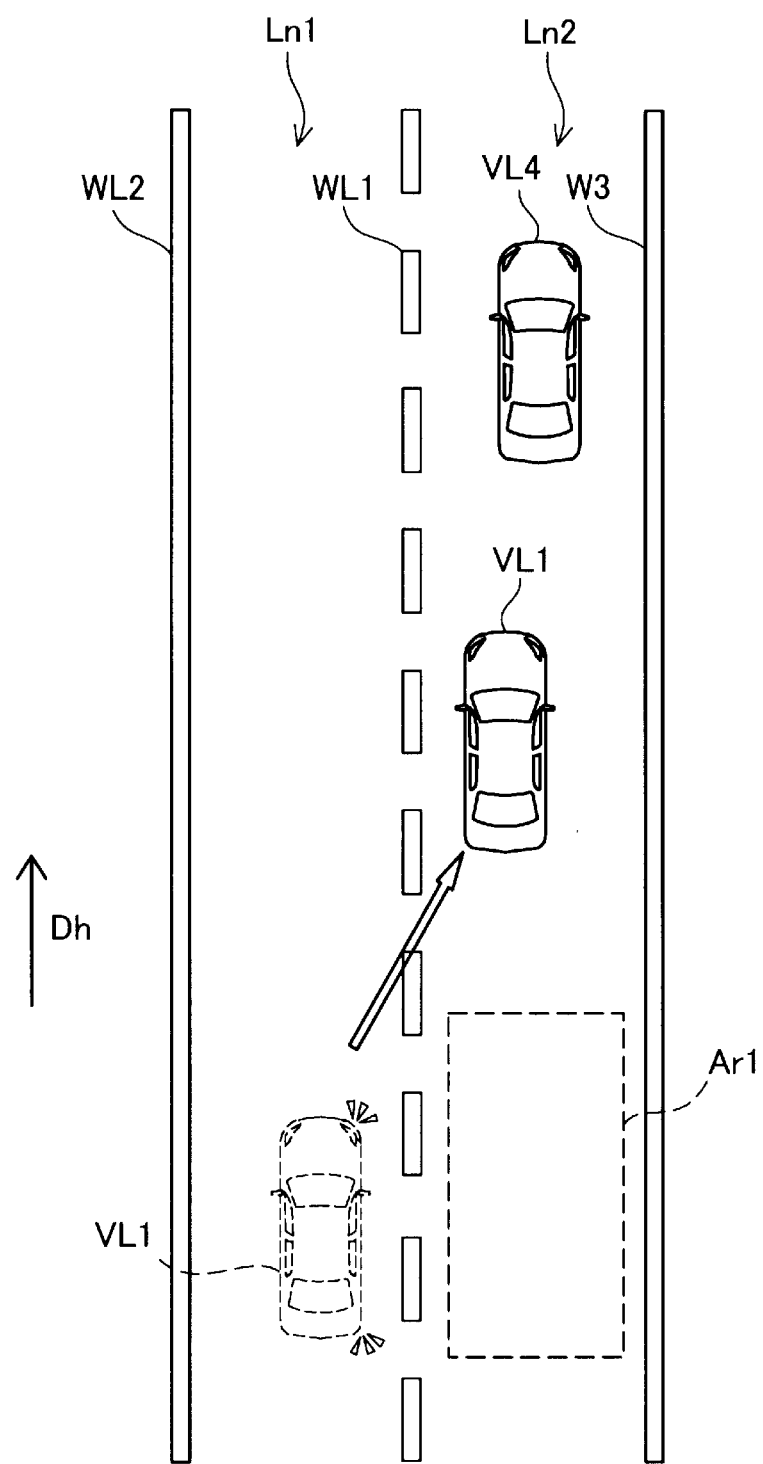
FIG. 8 is an explanatory diagram showing an example of a movement candidate space of the first embodiment.

On the other hand, when no override is present (NO at step S150), the operation control unit 15 acquires a sensing result on the destination lane side obtained by the object detection unit 22 (step S155). On the basis of the sensing result acquired at step S155, the operation control unit 15 determines whether a movement candidate space is present in the destination lane (step S160). The movement candidate space means a space of a predetermined size to which the own vehicle VL1 can be moved. For example, as shown in FIG. 8, the movement candidate space may be a space Ar1 that has a rectangular shape in plan view and has a width twice the width of the own vehicle VL1 and a length 1.5 times the length of the own vehicle VL1. However, the size of the movement candidate space is not limited to this, and may be any size that allows the own vehicle VL1 to be moved to the movement candidate space. In FIG. 8, no vehicle is stopped in the lane Ln2, but if a vehicle is stopped in the space Ar1 shown in FIG. 8 and thus the width of the space Ar1 is smaller than twice the width of the own vehicle VL1, the space Ar1 is not identified as the movement candidate space.

As shown in FIG. 3, when it is determined that no movement candidate space is present in the destination lane (NO at step S160), control returns to step S145 described above. On the other hand, when it is determined that a movement candidate space is present in the destination lane (YES at step S160), the operation control unit 15 controls the operation control device 200 to perform a lane change (step S165), and determines whether the lane change is completed (step S170). When it is determined that the lane change is not completed (NO at step S170), control returns to step S145 described above. Control returns to step S145 because there is a possibility that due to a change in the driver's intention to perform a lane change, the operation situation of the turn signal 221 may be changed during the lane change. At step S165 described above, a locus (a plurality of target positions) toward the movement candidate space is set, and the own vehicle VL1 is controlled to pass through each of the target positions. At step S170, depending on whether the own vehicle VL1 has reached the final target position, it is determined whether the lane change is completed. When it is determined that the lane change is completed (YES at step S170), control returns to step S105 described above. As shown in FIG. 8, when the space Ar1 as the movement candidate space is found, assuming that the space Ar1 is also moved in the direction Dh in the same manner as the own vehicle VL1, the own vehicle VL1 is controlled to be moved toward the space Ar1 which has moved in the direction Dh. Then, as shown in FIG. 8, the own vehicle VL1 is moved to the lane Ln2, and the lane change is completed.

According to the driving assistance device 10 of the first embodiment described above, when it is detected that the own vehicle is scheduled to perform a lane change and it is determined that the passable space Ar0 is present, before the lane change is performed, the own vehicle VL1 is controlled to perform the lateral movement operation which causes the own vehicle VL1 to approach the destination lane (lane Ln2). Therefore, it is possible to prevent a driver of the moving object MB1 from performing a passing operation, thereby preventing the moving object MB1 from passing through the space between the own vehicle VL1 and the object vehicle VL4 during the lane change.

Furthermore, when the moving object MB1 is not detected in the passable space Ar0, the own vehicle VL1 is controlled to perform the lateral movement operation, and when the moving object MB1 is detected in the passable space Ar0, the own vehicle VL1 is controlled not to perform the lateral movement operation. Therefore, it is possible to prevent the own vehicle VL1 from coming into contact with the moving object MB1 due to the lateral movement operation.

Furthermore, as the lateral movement operation, the own vehicle VL1 is operated so that the distance D1 in the intersecting direction between the own vehicle VL1 and the first white line WL1 is shorter than the distance D2 in the intersecting direction between the own vehicle VL1 and the second white line. Therefore, the own vehicle VL1 can approach the destination lane (lane Ln2) side in the original lane (lane Ln1).

Furthermore, when it is detected that the own vehicle is scheduled to perform a lane change, it is determined that the passable space Ar0 is present, and it is determined that no movement candidate space is present, the own vehicle is controlled not to perform the lateral movement operation. Therefore, it is possible to prevent the own vehicle from performing an unnecessary lateral movement operation when no lane change can be performed.

B. Second Embodiment

A device configuration of the driving assistance device 10 of the second embodiment is the same as the device configuration of the driving assistance device 10 of the first embodiment, and thus the same components will be given the same reference numerals and will not be described in detail. A driving assistance process of the second embodiment differs from the driving assistance process of the first embodiment in the detailed procedure of the lateral movement operation (step S140). The other steps of the driving assistance process of the second embodiment are the same as the steps of the driving assistance process of the first embodiment, and thus the same steps will be given the same reference numerals and will not be described in detail.

Figure 9:
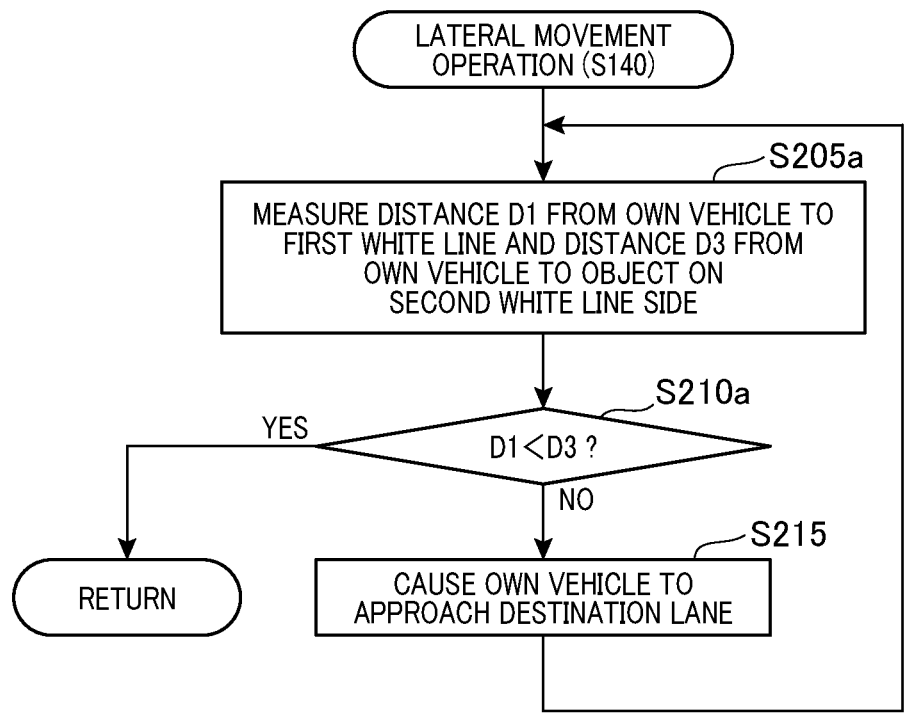
FIG. 9 is a flow chart showing a procedure of a lateral movement operation of a second embodiment.

As shown in FIG. 9, the lateral movement operation of the second embodiment differs from the lateral movement operation of the first embodiment shown in FIG. 6 in that instead of step S205, step S205a is performed, and instead of step S210, step S210a is performed. Specifically, on the basis of the white line detection result obtained by the white line detection unit 21, the operation control unit 15 measures the distance D1 from the own vehicle VL1 to the first white line WL1 and a distance D3 from the own vehicle VL1 to an object that is present on the second white line WL2 side (step S205a). The object that is present on the second white line WL2 side corresponds to, for example, an object vehicle that is stopped, a construction sign, and a bicycle that is traveling in the vicinity of the second white line WL2. The operation control unit 15 determines whether the distance D1 is smaller than the distance D3 (step S210a), and when it is determined that the distance D1 is not smaller than the distance D3 (NO at step S210a), step S215 described above is performed. When it is determined that the distance D1 is smaller than the distance D3 (YES at step S210a), the lateral movement operation is ended, and step S145 described above is performed.

Figure 10:
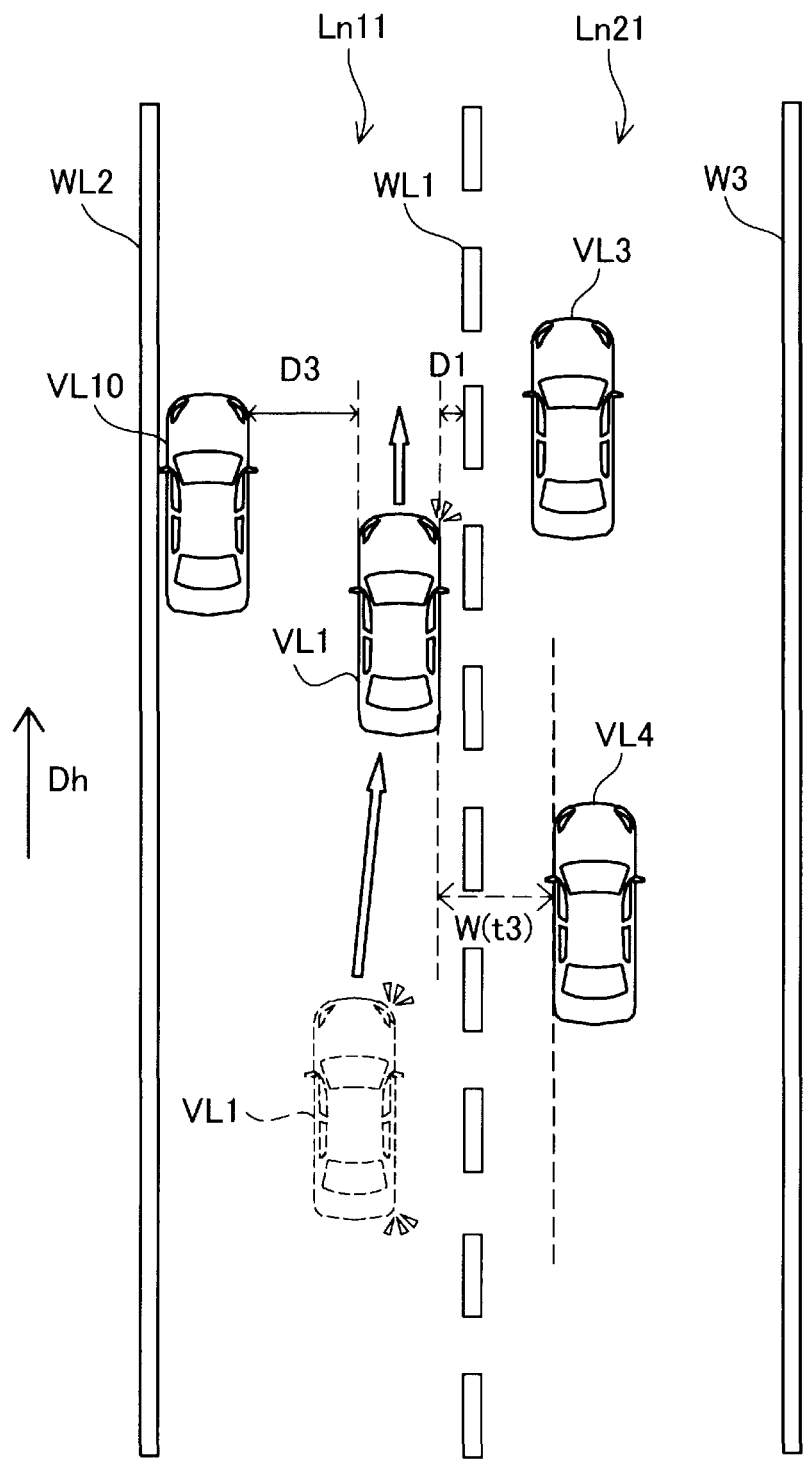
FIG. 10 is an explanatory diagram showing an example of the lateral movement operation of the second embodiment.

Due to the lateral movement operation described above, as shown in FIG. 10, when the own vehicle VL1 in the situation shown in FIG. 4 performs the lateral movement operation (step S140), at time t3, the own vehicle VL1 approaches the lane Ln2. In the situation shown in FIG. 10, in the lane Ln1, a vehicle VL10 is stopped at a position close to the second white line WL2 in front of the own vehicle VL1. Thus, the operation of the own vehicle VL1 is controlled so that the distance D1 between the own vehicle VL1 and the first white line WL1 is smaller than the distance D3 between the vehicle VL10 and the own vehicle VL1. At this time, an interval W (t3) between the own vehicle VL1 and the object vehicle VL4 in the intersecting direction is shorter than the interval W (t1) before the lateral movement operation is performed.

The driving assistance device 10 of the second embodiment described above has the same effects as the driving assistance device 10 of the first embodiment. In addition, as the lateral movement operation, the own vehicle VL1 is operated so that the interval between the own vehicle VL1 and the first white line WL1 in the intersecting direction is shorter than the interval between the own vehicle VL1 and an object (vehicle VL10) in the intersecting direction, the object (vehicle VL10) is present on the second white line WL2 side when viewed from the own vehicle. Therefore, the own vehicle can approach the destination lane (lane Ln2) side in a region of the original lane (lane Ln1) from which the object that is present on the second white line WL2 side is excluded and in which the own vehicle can travel.

C. Third Embodiment

A device configuration of the driving assistance device 10 of the third embodiment is the same as the device configuration of the driving assistance device 10 of the first embodiment, and thus the same components will be given the same reference numerals and will not be described in detail. A driving assistance process of the third embodiment differs from the driving assistance process of the first embodiment in the detailed procedure of the lateral movement operation (step S140). The other steps of the driving assistance process of the third embodiment are the same as the steps of the driving assistance process of the first embodiment, and thus the same steps will be given the same reference numerals and will not be described in detail.

Figure 11:
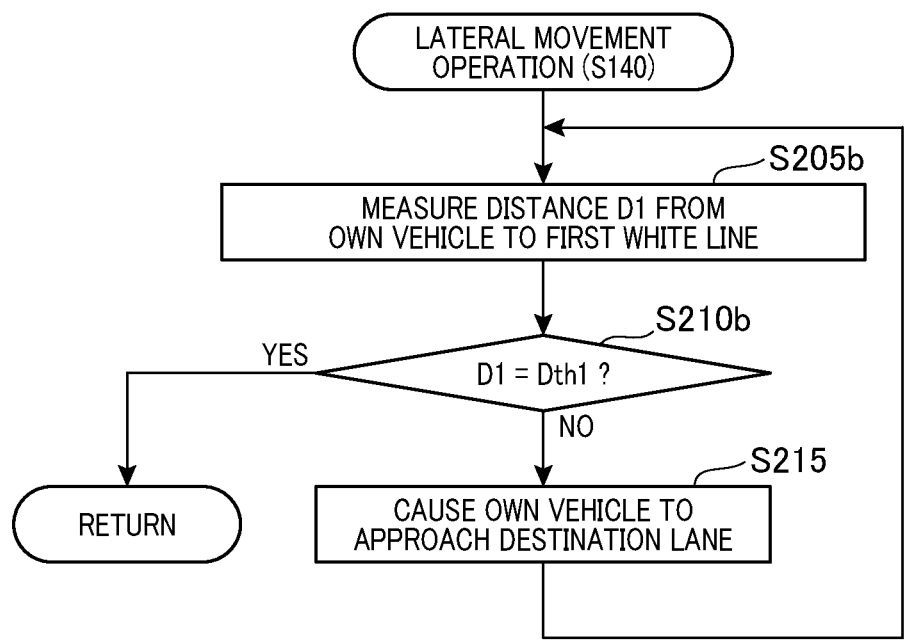
FIG. 11 is a flow chart showing a procedure of a lateral movement operation of a third embodiment.

As shown in FIG. 11, the lateral movement operation of the third embodiment differs from the lateral movement operation of the first embodiment shown in FIG. 6 in that instead of step S205, step S205b is performed, and instead of step S210, step S210b is performed. Specifically, on the basis of the white line detection result obtained by the white line detection unit 21, the operation control unit 15 measures the distance D1 from the own vehicle VL1 to the first white line WL1 (step S205b). The operation control unit 15 determines whether the distance D1 is equal to or greater than a predetermined distance (threshold) Dth1 (step S210b), and when it is determined that the distance D1 is greater than the distance Dth1 (NO at step S210b), step S215 described above is performed. When it is determined that the distance D1 is equal to the distance Dth1 (YES at step S210b), the lateral movement operation is ended, and step S145 described above is performed. The distance Dth1 is a predetermined distance smaller than ½ of the width of the original lane (lane Ln1). For example, the distance Dth1 may be 15 cm (centimeter). However, the distance Dth1 is not limited to 15 cm, and may be any distance smaller than ½ of the width of the original lane (lane Ln1).

The driving assistance device 10 of the third embodiment described above has the same effects as the driving assistance device 10 of the first embodiment. In addition, as the lateral movement operation, the own vehicle VL1 is operated so that the interval between the own vehicle VL1 and the first white line WL1 in the intersecting direction is the predetermined distance Dth1. Therefore, the lateral movement operation can be easily performed.

D. Fourth Embodiment

A device configuration of the driving assistance device 10 of the fourth embodiment is the same as the device configuration of the driving assistance device 10 of the first embodiment, and thus the same components will be given the same reference numerals and will not be described in detail. A driving assistance process of the fourth embodiment differs from the driving assistance process of the first embodiment in the detailed procedure of the lateral movement operation (step S140). The other steps of the driving assistance process of the fourth embodiment are the same as the steps of the driving assistance process of the first embodiment, and thus the same steps will be given the same reference numerals and will not be described in detail.

Figure 12:
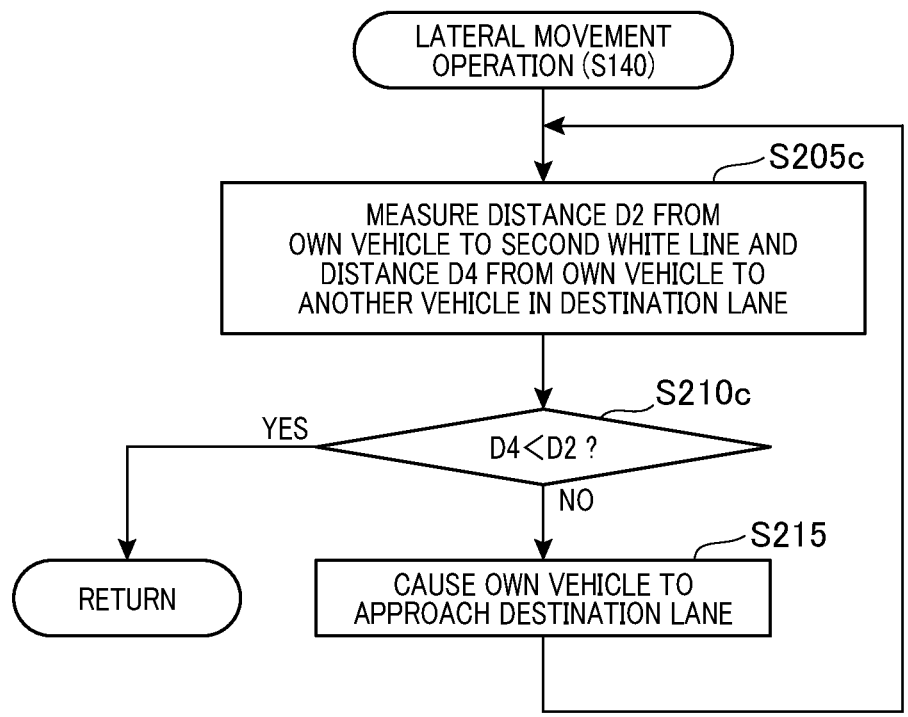
FIG. 12 is a flow chart showing a procedure of a lateral movement operation of a fourth embodiment.

As shown in FIG. 12, the lateral movement operation of the fourth embodiment differs from the lateral movement operation of the first embodiment shown in FIG. 6 in that instead of step S205, step S205c is performed, and instead of step S210, step S210c is performed. Specifically, on the basis of the white line detection result obtained by the white line detection unit 21, the operation control unit 15 measures the distance D2 from the own vehicle VL1 to the second white line WL2 in the intersecting direction, and on the basis of the sensing result obtained by the object detection unit 22, the operation control unit 15 measures a distance D4 from the own vehicle VL1 to an object vehicle (object vehicle VL4) in the intersecting direction in the destination lane (lane Ln2) (step S205c). The operation control unit 15 determines whether the distance D4 is smaller than the distance D2 (step S210c), and when it is determined that the distance D4 is not smaller than the distance D2 (NO at step S210c), step S215 described above is performed. When it is determined that the distance D4 is smaller than the distance D2 (YES at step S210c), the lateral movement operation is ended, and step S145 described above is performed.

Figure 13:
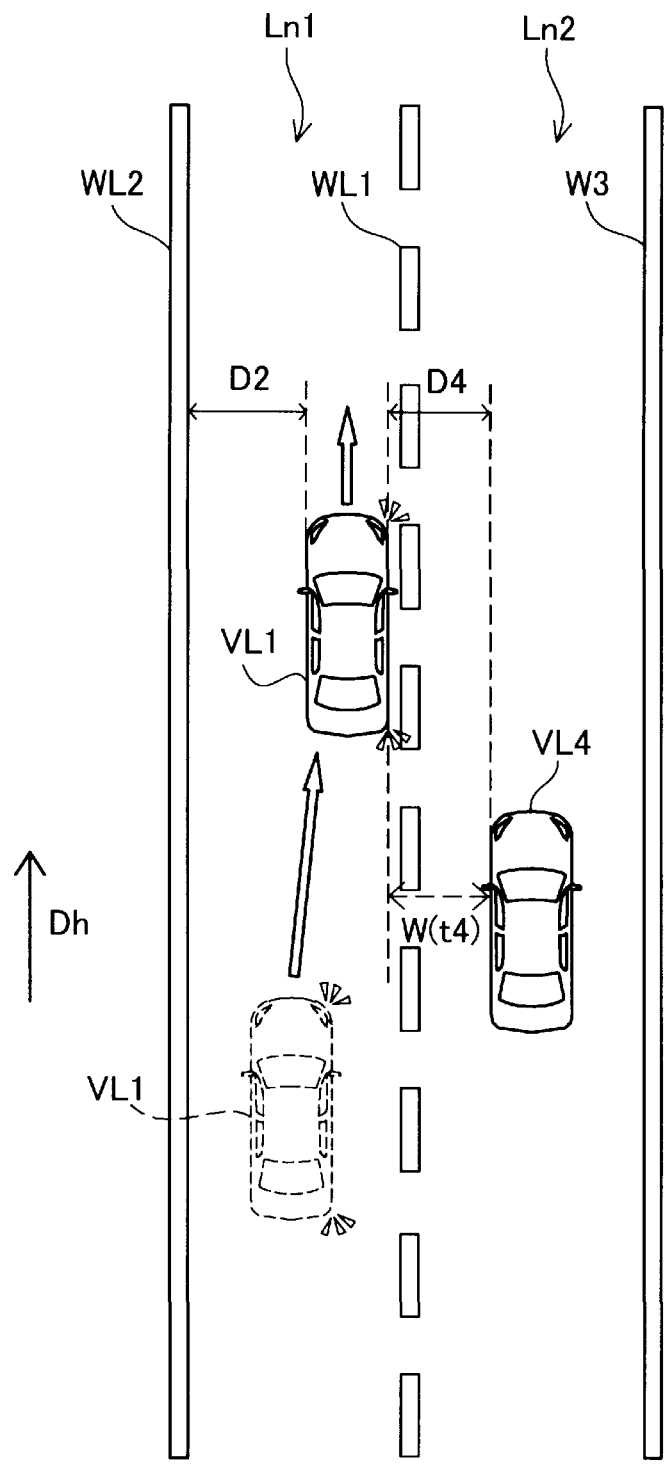
FIG. 13 is an explanatory diagram showing an example of the lateral movement operation of the fourth embodiment.

Due to the lateral movement operation described above, as shown in FIG. 13, when the own vehicle VL1 in the situation shown in FIG. 4 performs the lateral movement operation (step S140), at time t4, the own vehicle VL1 approaches the lane Ln2. At this time, an interval W (t4) between the own vehicle VL1 and the object vehicle VL4 in the intersecting direction is shorter than the interval W (t1) before the lateral movement operation is performed.

The driving assistance device 10 of the fourth embodiment described above has the same effects as the driving assistance device 10 of the first embodiment. In addition, as the lateral movement operation, the own vehicle VL1 is operated so that the interval between the own vehicle VL1 and the object vehicle VL4 traveling in the destination lane (lane Ln2) in the intersecting direction is shorter than the interval between the own vehicle VL1 and the second white line WL2 in the intersecting direction. Therefore, the own vehicle VL1 can approach the object vehicle VL4 side in a region that extends in the intersecting direction between the second white line WL2 and the object vehicle VL4 and in which the own vehicle can travel.

E. Fifth Embodiment

A device configuration of the driving assistance device 10 of the fifth embodiment is the same as the device configuration of the driving assistance device 10 of the first embodiment, and thus the same components will be given the same reference numerals and will not be described in detail. A driving assistance process of the fifth embodiment differs from the driving assistance process of the first embodiment in the detailed procedure of the lateral movement operation (step S140). The other steps of the driving assistance process of the fifth embodiment are the same as the steps of the driving assistance process of the first embodiment, and thus the same steps will be given the same reference numerals and will not be described in detail.

Figure 14:
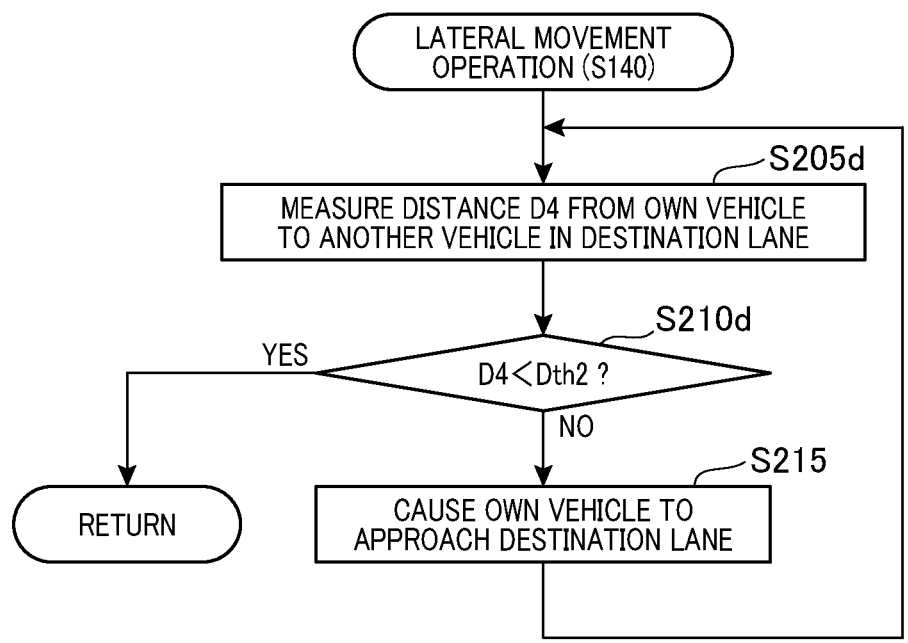
FIG. 14 is a flow chart showing a procedure of a lateral movement operation of a fifth embodiment.

As shown in FIG. 14, the lateral movement operation of the fifth embodiment differs from the lateral movement operation of the first embodiment shown in FIG. 6 in that instead of step S205, step S205d is performed, and instead of step S210, step S210d is performed. Specifically, on the basis of the sensing result obtained by the object detection unit 22, the operation control unit 15 measures the distance D4 from the own vehicle VL1 to an object vehicle (object vehicle VL4) in the intersecting direction in the destination lane (lane Ln2) (step S205d). The operation control unit 15 determines whether the distance D4 is smaller than a predetermined distance Dth2 (step S210d), and when it is determined that the distance D4 is not smaller than the distance Dth2 (NO at step S210d), step S215 described above is performed. When it is determined that the distance D4 is smaller than the distance Dth2 (YES at step S210d), the lateral movement operation is ended, and step S145 described above is performed. The distance Dth2 is a distance smaller than the distance in the intersecting direction between the own vehicle VL1 and the object vehicle VL4 used at step S120 to determine the presence or absence of a passable space. The distance Dth2 may be, for example, 50 cm. However, the distance Dth2 is not limited to 50 cm, and may be any distance.

The driving assistance device 10 of the fifth embodiment described above has the same effects as the driving assistance device 10 of the first embodiment. In addition, as the lateral movement operation, the own vehicle VL1 is operated so that the interval D4 between the own vehicle VL1 and the object vehicle VL4 traveling in the destination lane (lane Ln2) in the intersecting direction is smaller than the distance in the intersecting direction between the own vehicle VL1 and the object vehicle VL4 used at step S120 to determine the presence or absence of a passable space. Therefore, the interval between the own vehicle VL1 and the object vehicle VL4 in the intersecting direction can be reduced as compared with before the lateral movement operation is performed.

F. Sixth Embodiment

A device configuration of the driving assistance device 10 of the sixth embodiment is the same as the device configuration of the driving assistance device 10 of the first embodiment, and thus the same components will be given the same reference numerals and will not be described in detail. A driving assistance process of the sixth embodiment differs from the driving assistance process of the first embodiment in the detailed procedure of the lateral movement operation (step S140). The other steps of the driving assistance process of the sixth embodiment are the same as the steps of the driving assistance process of the first embodiment, and thus the same steps will be given the same reference numerals and will not be described in detail. Furthermore, the detailed procedure of the lateral movement operation of the sixth embodiment is the same as the detailed procedure of the lateral movement operation of the third embodiment shown in FIG. 11, and thus will not be described in detail.

In the lateral movement operation of the sixth embodiment, the length of the distance Dth1 at step S210b (the threshold for the distance between the own vehicle VL1 and the first white line WL1 in the intersecting direction) is determined in advance according to the presence or absence of an object vehicle in the destination lane. Specifically, when an object vehicle is present in the destination lane, the length of the distance Dth1 is set to be larger than when no object vehicle is present in the destination lane.

Figure 15:
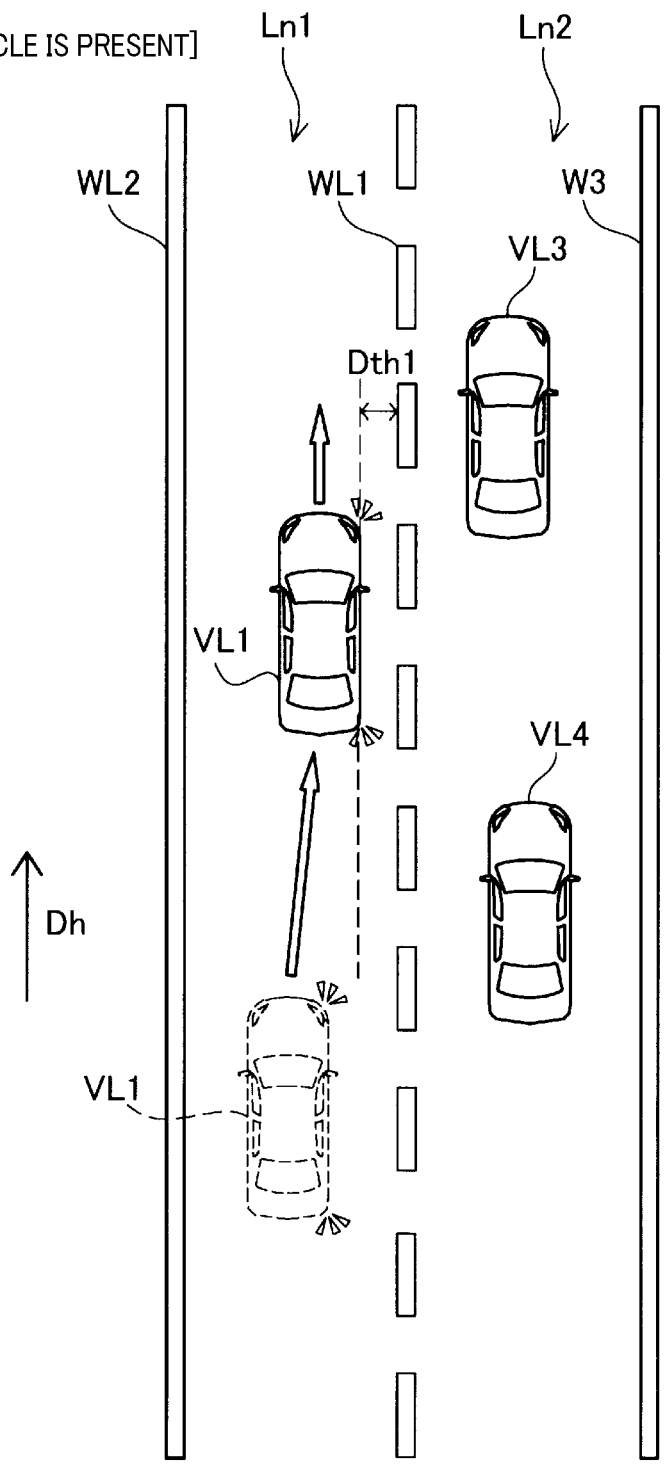
FIG. 15 is an explanatory diagram showing an example of a lateral movement operation of a sixth embodiment.
Figure 16:
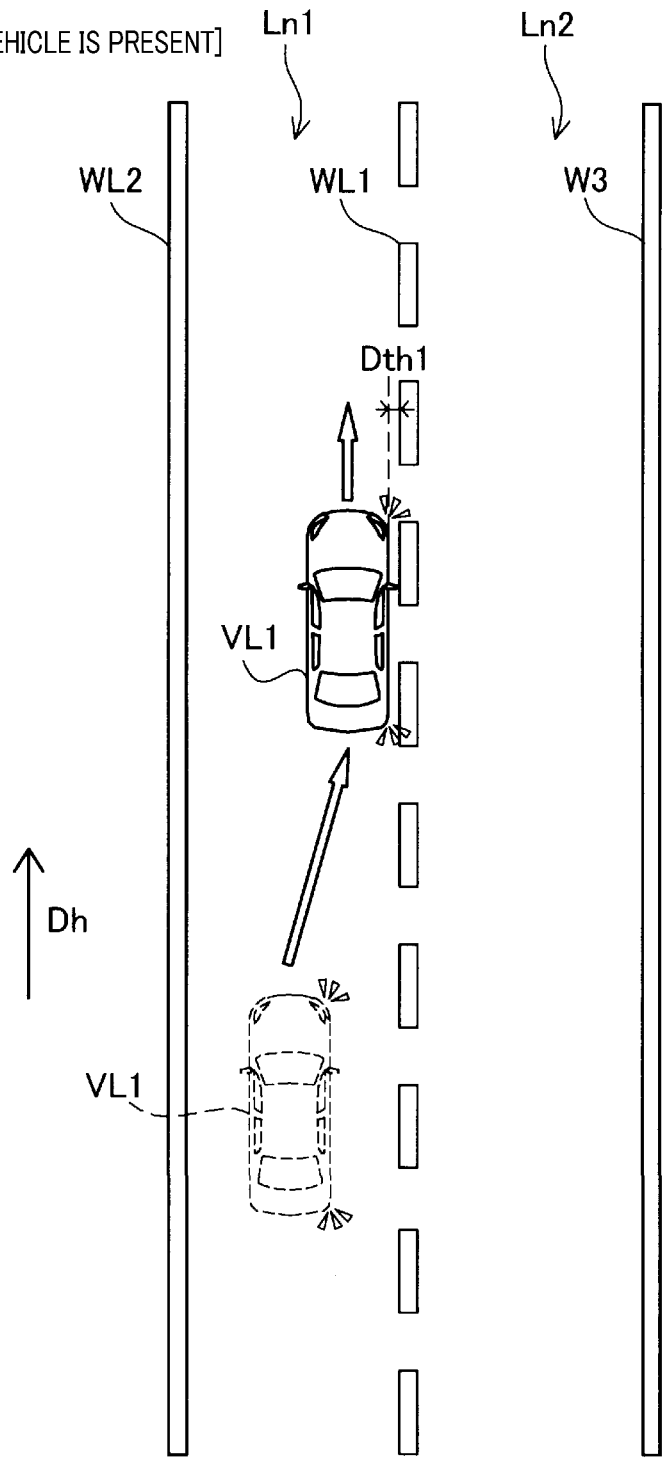
FIG. 16 is an explanatory diagram showing an example of the lateral movement operation of the sixth embodiment.

In an example shown in FIG. 15, in the lane Ln2 which is the destination lane, the object vehicle VL4 is present behind the own vehicle VL1. On the other hand, in an example shown in FIG. 16, in the lane Ln2, no object vehicle is present behind the own vehicle VL1. As is clear from comparison between these two examples, the length of the distance Dth1 in the example shown in FIG. 15 is larger than the length of the distance Dth1 in the example shown in FIG. 16.

The driving assistance device 10 of the sixth embodiment described above has the same effects as the driving assistance device 10 of the third embodiment. In addition, when no object vehicle is present, the distance between the first white line WL1 and the own vehicle VL1 during the lateral movement operation is set to be shorter than when the object vehicle VL4 is present. Therefore, it is possible to prevent a moving object from passing through the space on the destination lane (lane Ln2) side of the own vehicle VL1 while preventing an increase in psychological burden on a driver of the object vehicle VL4 due to the lateral movement operation.

G. Seventh Embodiment

A device configuration of the driving assistance device 10 of the seventh embodiment is the same as the device configuration of the driving assistance device 10 of the first embodiment, and thus the same components will be given the same reference numerals and will not be described in detail. A driving assistance process of the seventh embodiment differs from the driving assistance process of the first embodiment in the detailed procedure of the lateral movement operation (step S140). The other steps of the driving assistance process of the seventh embodiment are the same as the steps of the driving assistance process of the first embodiment, and thus the same steps will be given the same reference numerals and will not be described in detail.

Figure 17:
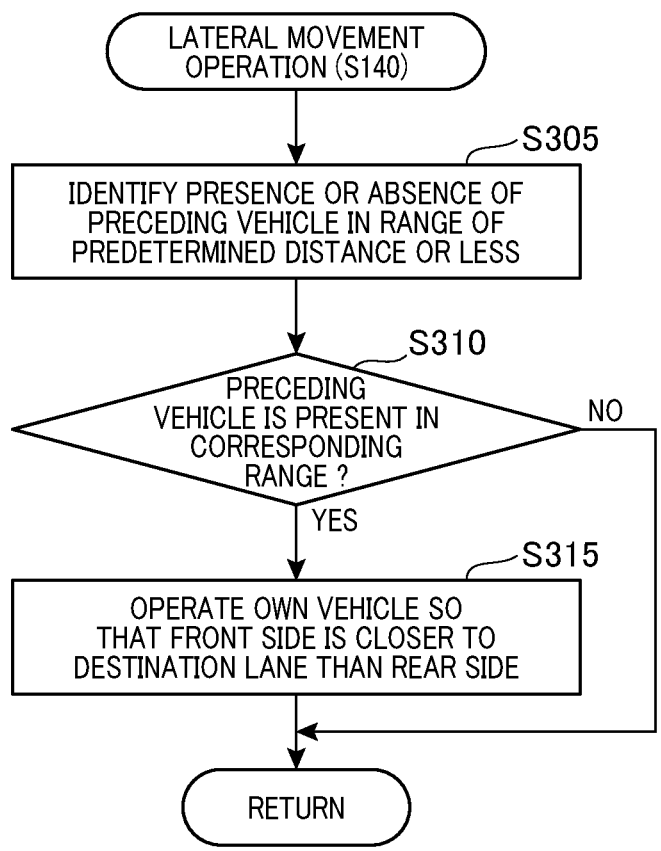
FIG. 17 is a flow chart showing a procedure of a lateral movement operation of a seventh embodiment.

As shown in FIG. 17, in the lateral movement operation of the seventh embodiment, first, on the basis of the sensing result obtained by the object detection unit 22, the operation control unit 15 identifies the presence or absence of a preceding vehicle in the range of a predetermined distance or less in the original lane (lane Ln1) (step S305). In the present embodiment, the "predetermined distance" at step S305 is set to the same distance as a distance that is set in advance as a target distance between the own vehicle and a preceding vehicle when, during automatic driving, the preceding vehicle is stopped and the own vehicle is automatically stopped. Such a distance may be set to, for example, 4 m. However, the distance is not limited to 4 m, and may be set to any distance. As a result of step S305, the operation control unit 15 determines whether a preceding vehicle is present in the corresponding range (step S310).

When it is determined that no preceding vehicle is present in the corresponding range (NO at step S310), the lateral movement operation is ended, and step S145 described above is performed. On the other hand, when it is determined that a preceding vehicle is present in the corresponding range (YES at step S310), the operation control unit 15 controls the operation control device 200 to cause the own vehicle VL1 to be operated so that a front side of the own vehicle VL1 is closer to the destination lane (lane Ln2) than a rear side of the own vehicle VL1 is (step S315). After step S315, the lateral movement operation is ended, and step S145 described above is performed.

Figure 18:
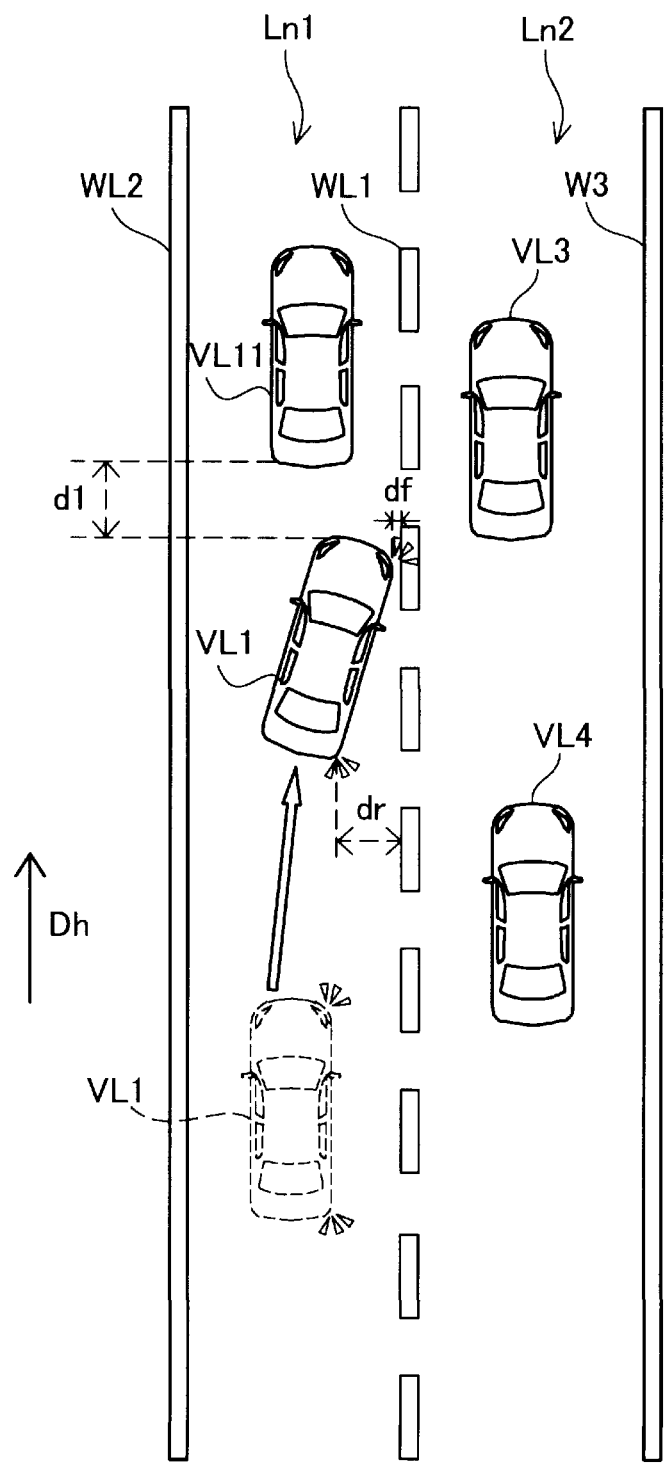
FIG. 18 is an explanatory diagram showing an example of the lateral movement operation of the seventh embodiment.
Figure 19:
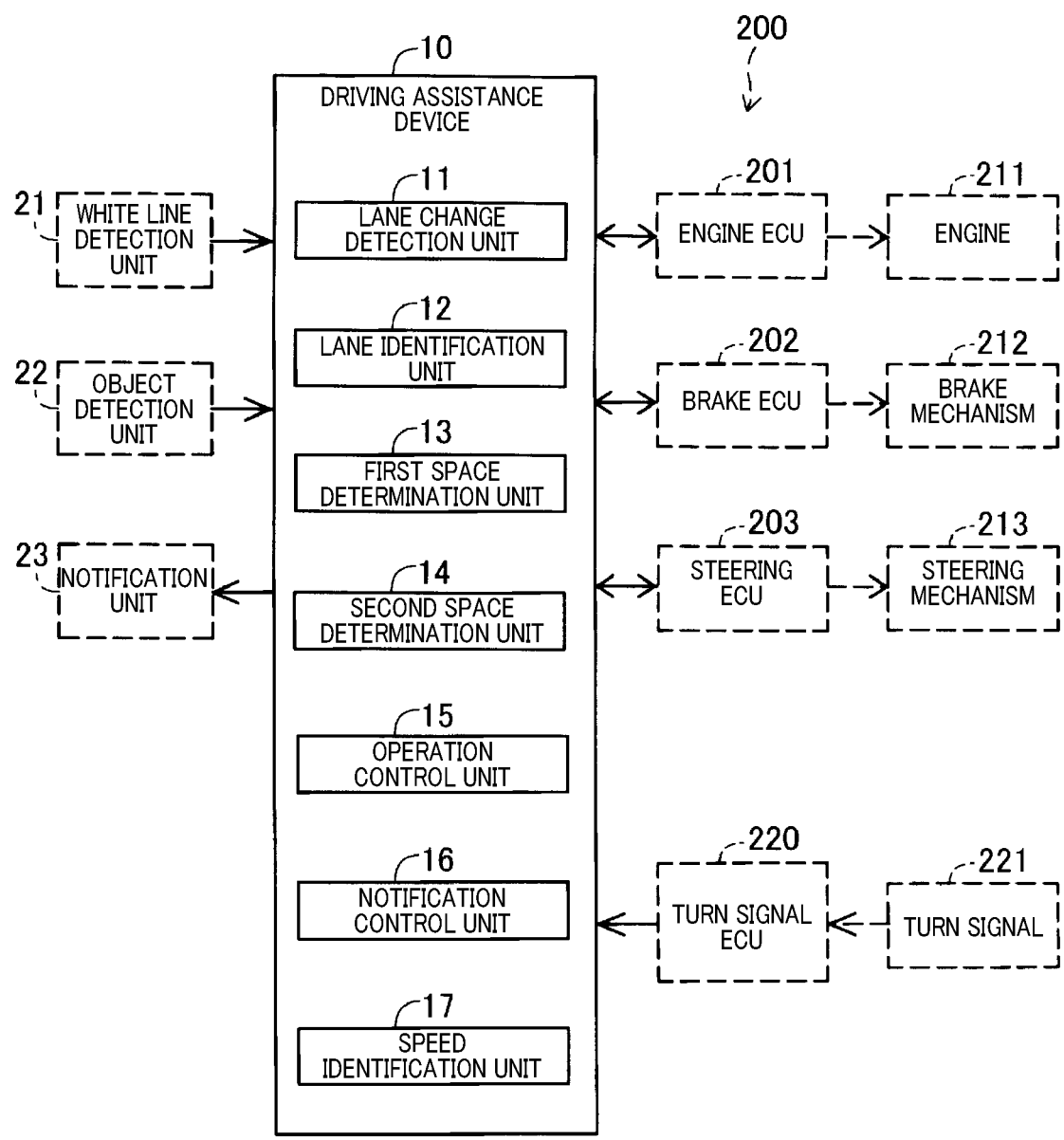
FIG. 19 is a block diagram showing a schematic configuration of a driving assistance device of an eighth embodiment.

As shown in FIG. 18, when a distance dl between the own vehicle VL1 and a preceding vehicle VL11 is the predetermined distance at step S305 or less and the preceding vehicle VL11 is present in the corresponding range, the own vehicle VL1 is oriented so that the front side of the own vehicle VL1 is closer to the lane Ln2 than the rear side of the own vehicle VL1 is. In this orientation, a distance df between a right end portion on the front side of the own vehicle VL1 and the first white line WL1 in the intersecting direction is smaller than a distance dr between a right end portion on the rear side of the own vehicle VL1 and the first white line WL1 in the intersecting direction. At this time, the own vehicle VL1 is stopped by automatic driving, and thus the own vehicle VL1 is stopped in the orientation shown in FIG. 18. By stopping the own vehicle VL1 in this orientation, it is possible to clearly indicate, to a driver of a moving object attempting to pass through the space between the own vehicle VL1 and the object vehicle VL4, that when the traveling is resumed by the own vehicle VL1, a lane change to the lane Ln2 is to be performed by the own vehicle VL1. Thus, it is possible to prevent the moving object from passing through the space between the own vehicle VL1 and the object vehicle VL4.

The driving assistance device 10 of the seventh embodiment described above has the same effects as the driving assistance device 10 of the first embodiment. In addition, when the preceding vehicle VL11 is present in the range of the predetermined distance or less in front of the own vehicle VL1, as the lateral movement operation, the own vehicle VL1 is operated so that the front side of the own vehicle VL1 is closer to the destination lane (lane Ln2) than the rear side of the own vehicle VL1 is. Accordingly, for example, in a situation where the own vehicle VL1 and vehicles around the own vehicle VL1 including the preceding vehicle VL11 are stopped or are traveling at a low speed due to a traffic jam or the like and thus the distance between the own vehicle VL1 and the preceding vehicle VL11 is short, the front side of the own vehicle VL1 can be closer to the destination lane (lane Ln2) than the rear side of the own vehicle VL1 is. Therefore, it is possible to indicate, to a driver of a moving object, that when the traveling is subsequently resumed by the own vehicle VL1, the own vehicle VL1 is scheduled to perform a lane change. Thus, when the traveling is resumed and the own vehicle VL1 is scheduled to perform the lane change, it is possible to prevent the moving object from passing through the space between the own vehicle VL1 and the object vehicle VL4.

H. Eighth Embodiment

A device configuration of the driving assistance device 10 of an eighth embodiment differs from the device configuration of the driving assistance device 10 of the first embodiment in that the device configuration of the eighth embodiment includes a speed identification unit 17. The rest of the configuration of the driving assistance device 10 of the eighth embodiment is the same as the configuration of the driving assistance device 10 of the first embodiment, and thus the same components will be given the same reference numerals and will not be described in detail. Furthermore, a driving assistance process of the eighth embodiment is the same as the driving assistance process of the first embodiment, and thus the same steps will be given the same reference numerals and will not be described in detail.

The speed identification unit 17 identifies a speed of the own vehicle VL1 on the basis of a measurement value obtained by a vehicle speed sensor (not shown). As with the lane change detection unit 11, the lane identification unit 12, and the like, the speed identification unit 17 is implemented by the microcomputer (not shown) of the driving assistance device 10 executing the control program stored in advance in the storage unit (not shown) of the driving assistance device 10.

The driving assistance device 10 of the eighth embodiment differs from the driving assistance device 10 of the first embodiment in that the length (predetermined threshold length) used as the threshold for the interval W in the intersecting direction when the presence or absence of a passable space is identified at step S115 is set in advance according to the speed of the own vehicle VL1. Specifically, when the speed of the own vehicle VL1 is a predetermined threshold speed or more, the predetermined threshold length is set to be larger, and when the speed of the own vehicle VL1 is less than the threshold speed, the predetermined threshold length is set to be smaller. The threshold speed may be, for example, 10 km (kilometer) per hour. However, the threshold speed is not limited to 10 km per hour, and may be set to any speed. For example, when the speed of the own vehicle VL1 is the threshold speed or more, the length may be set to 1 m, and when the speed of the own vehicle VL1 is less than the threshold speed, the length may be set to 50 cm.

Figure 20:
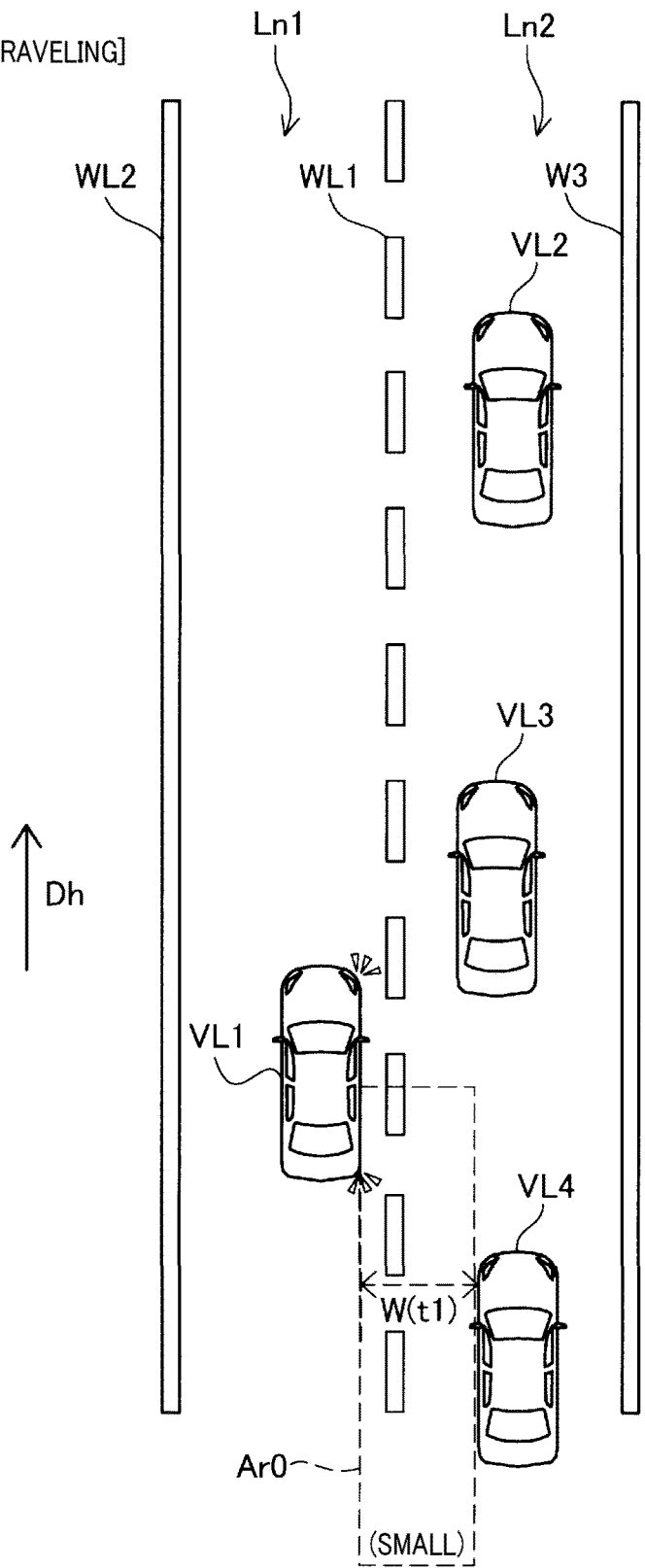
FIG. 20 is an explanatory diagram showing an example of a passable space during low-speed traveling of the eighth embodiment.
Figure 21:
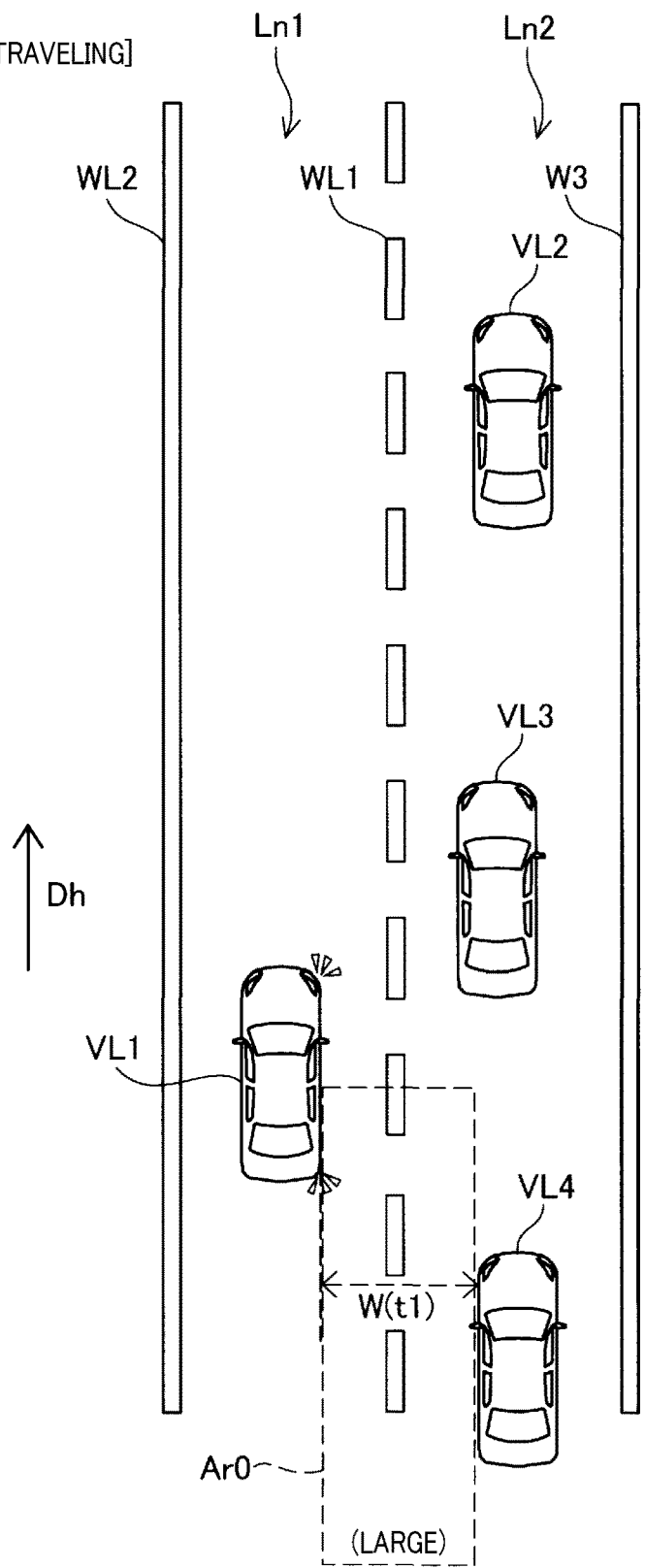
FIG. 21 is an explanatory diagram showing an example of a passable space during high-speed traveling of the eighth embodiment.

For example, during low-speed traveling as shown in FIG. 20 in which the speed of the own vehicle VL1 identified by the speed identification unit 17 is less than the threshold speed, the length in the intersecting direction of the passable space Ar0 is set to be smaller than during high-speed traveling as shown in FIG. 21 in which the speed of the own vehicle VL1 is the threshold speed or more. Accordingly, during the low-speed traveling, at step S115, the presence or absence of a relatively small region is identified as the passable space Ar0.

Thus, during the low-speed traveling, the presence or absence of a relatively small region is identified as the passable space Ar0 because during the low-speed traveling, a driver of a moving object enters a relatively narrow space and attempts to pass through the space.

The driving assistance device 10 of the eighth embodiment described above has the same effects as the driving assistance device 10 of the first embodiment. In addition, during the low-speed traveling in which the speed of the own vehicle VL1 is less than the threshold speed, the predetermined threshold length in the intersecting direction used when the presence or absence of a passable space is identified is set to be smaller than during the high-speed traveling in which the speed of the own vehicle VL1 is the threshold speed or more. Therefore, even in a situation where the speed of the own vehicle VL1 is low and thus a moving object is more likely to pass through a space between the own vehicle VL1 and an object vehicle, it is possible to more reliably prevent the moving object from passing through the space during the lane change.

I. Other Embodiments

I1. Another Embodiment 1

In the embodiments, when the operation state of the turn signal 221 informed from the turn signal ECU 220 is changed from the OFF state to the ON state, the lane change detection unit 11 detects that the own vehicle is scheduled to perform a lane change, but the present disclosure is not limited to this. The lane change detection unit 11 may detect that the own vehicle is scheduled to perform a lane change, for example, on the basis of a change in yaw rate detected by a yaw rate sensor mounted on the own vehicle VL1 or a steering angle detected by a steering angle sensor (a rotation angle detected by a rotation angle sensor for detecting a steering position of a steering wheel as a rotation angle of a steering shaft) mounted on the own vehicle VL1. Alternatively, the lane change detection unit 11 may detect that the own vehicle is scheduled to perform a lane change when the own vehicle VL1 traveling in a predetermined route attempts to turn right at an intersection in the route and the own vehicle VL1 has reached a predetermined distance before (e.g., 100 m before) the intersection. This is because when the own vehicle VL1 has reached the predetermined distance before the intersection, the own vehicle VL1 is highly likely to perform a lane change from the lane in which the vehicle travels straight to a lane that allows the vehicle to turn right.

I2. Another Embodiment 2

In the embodiments, the notification control unit 16 causes the notification unit 23 to notify that the moving object MB1 is present in the passable space. However, instead of or in addition to such a notification, another notification may be provided. For example, when it is determined that no moving object is present (NO at step S130), before the lateral movement operation (step S140) is performed, the notification unit 23 may notify that it has been detected that the own vehicle is scheduled to perform a lane change and it has been determined that a passable space is present. According to such a configuration, the notification unit 23 can notify that it has been detected that the own vehicle is scheduled to perform a lane change and it has been determined that a passable space is present. Therefore, it is possible to allow the driver of the own vehicle VL1 to know the reason why the lateral movement operation is performed before the lane change is performed, thereby preventing the driver from feeling uncomfortable.

I3. Another Embodiment 3

In the eighth embodiment, in the case where the presence or absence of a passable space is identified at step S115, the length (predetermined threshold length) used as the threshold for the interval W in the intersecting direction is set so that when the speed of the own vehicle VL1 is the predetermined threshold speed or more, the predetermined threshold length is set to a larger value, and when the speed of the own vehicle VL1 is less than the threshold speed, the predetermined threshold length is set to a smaller value, However, the present disclosure is not limited to this. For example, the predetermined threshold length may be set in advance in a stepwise or continuous manner according to the speed of the own vehicle VL1 so that the predetermined threshold length is set to be larger as the speed of the own vehicle VL1 is higher. Such a configuration also has the same effects as the eighth embodiment.

I4. Another Embodiment 4

In the embodiments, the notification unit 23 includes the monitor display and the speaker. However, instead of or in addition to the monitor display and the speaker, the notification unit 23 may include any device that can notify that the moving object MB1 is present in the passable space. The notification unit 23 may include, for example, an LED lamp that flashes in a predetermined pattern, or a vibration device that vibrates a steering wheel in a predetermined pattern.

I5. Another Embodiment 5

The configuration of the driving assistance device 10 of the embodiments is merely an example and may be modified in various manners. For example, the notification unit 23 and the notification control unit 16 may be omitted, and step S135 may also be omitted. Furthermore, steps S125 and S130 may be omitted, and the lateral movement operation (step S140) may be performed regardless of the presence or absence of a moving object. Furthermore, steps S155 and S160 may be omitted, and the lane change (step S165) may be performed regardless of the presence or absence of a movement candidate space. Furthermore, in the embodiments, the lateral movement operation may be performed to such an extent that the own vehicle does not exceed the first white line WL1. Furthermore, at step S210 of the first embodiment, instead of the comparison with the distance D2, the distance D1 may be compared with a value obtained by multiplying the distance D2 by a predetermined ratio. For example, the distance D1 may be compared with ½ of the distance D2. Furthermore, in the embodiments, the boundary in the width direction of the lane is the white line, i.e., the white line drawn on the road surface. However, the boundary is not limited to the white line, and may be a boundary in any mode such as a line drawn in a different color or a strip-shaped portion protruding along the lane on the road surface. In this case, instead of or in addition to the white line detection unit 21, the own vehicle may include a boundary detection unit. The boundary detection unit may detect a boundary by using a captured image obtained by the camera mounted on the own vehicle or using a sensing result obtained by the sensor such as a millimeter wave radar or a LiDAR sensor mounted on the own vehicle.

I6. Another Embodiment 6

In the embodiments, part of the configuration implemented by hardware may be replaced with software, and conversely, part of the configuration implemented by software may be replaced with hardware. For example, at least one functional unit among the lane change detection unit 11, the lane identification unit 12, the first space determination unit 13, the second space determination unit 14, the operation control unit 15, the notification control unit 16, and the speed identification unit 17 may be implemented by an integrated circuit, a discrete circuit, or a module in which these circuits are combined. When some or all of the functions of the present disclosure are implemented by software, the software (computer program) can be stored in a computer readable recording medium. The "computer readable recording medium" is not limited to a portable recording medium such as a flexible disk or a CD-ROM, but also includes various internal storage devices in a computer such as a RAM and a ROM and external storage devices fixed to the computer such as a hard disk. That is, the "computer readable recording medium" has a broad meaning including any recording medium that can store a data packet not temporarily but in a fixed manner.

The present disclosure is not limited to the above embodiments, and can be implemented in various configurations without departing from the scope of the present disclosure. For example, in order to solve some or all of the above problems or to achieve some or all of the above effects, replacement or combination may be performed as appropriate in the technical features in the embodiments corresponding to the technical features in each embodiment described in Summary of the Invention. Unless the technical features are described as essential in the present specification, the technical features may be deleted as appropriate.

What is claimed is:

1. A driving assistance device configured to be mounted on an own vehicle, the driving assistance device comprising:
   a lane change detection unit that detects that the own vehicle is scheduled to perform a lane change;
   a lane identification unit configured to identify an original lane and a destination lane based on detection of a first boundary and a second boundary, the original lane being a lane in which the own vehicle travels before the lane change is performed, the destination lane being a lane in which the own vehicle is scheduled to travel after the lane change is performed, the first boundary being a boundary between the original lane and the destination lane, the second boundary being a boundary that defines the original lane and is located on a side opposite to the first boundary;
   a first space determination unit that configured to determine that a passable space is present at least between the own vehicle and an object vehicle traveling in the destination lane, on the side of the own vehicle nearer the destination lane with respect to a position of the own vehicle in the original lane, the passable space being a space through which a moving object can pass the own vehicle, the passable space comprising a space between the own vehicle and an object vehicle traveling in the destination lane; and
   an operation control unit configured to cause the own vehicle to perform a lateral movement operation before performing a lane change based on the first space determination unit determining that the passable space is present, the lateral movement operation causing the own vehicle to approach the destination lane.

2. The driving assistance device according to claim 1, further comprising a speed identification unit that identifies a speed of the own vehicle, wherein:
   determining that the passable space is present is based on an interval in an intersecting direction intersecting the destination lane between the own vehicle and the object vehicle being a first threshold distance or more; and
   the first threshold distance is set to be smaller as the identified speed is lower.

3. The driving assistance device according to claim 1, further comprising a notification control unit configured to control a notification unit mounted on the own vehicle to cause the notification unit to notify that it has been detected that the own vehicle is scheduled to perform a lane change and it has been determined that the passable space is present.

4. The driving assistance device according to claim 1, wherein
   the operation control unit is configured to determine that an object is present or absent in the passable space, and
   the operation control unit causes the own vehicle to perform the lateral movement operation based on determining that no moving object is detected in the passable space, and
   operation control unit disables the own vehicle from performing the lateral movement operation based on determining that the moving object is detected in the passable space.

5. The driving assistance device according to claim 1, wherein as the lateral movement operation, the operation control unit causes the own vehicle to operate so that an interval between the own vehicle and the first boundary in an intersecting direction is shorter than an interval between the own vehicle and the second boundary in the intersecting direction, the intersecting direction being a direction intersecting the destination lane.

6. The driving assistance device according to claim 1, wherein as the lateral movement operation, the operation control unit causes the own vehicle to operate so that an interval between the own vehicle and the first boundary in an intersecting direction is shorter than an interval between the own vehicle and an object that is present on a side of the second boundary when viewed from the own vehicle, the intersecting direction being a direction intersecting the destination lane.

7. The driving assistance device according to claim 1, wherein as the lateral movement operation, the operation control unit causes the own vehicle to operate so that an interval between the own vehicle and the first boundary in an intersecting direction intersecting the destination lane becomes a predetermined distance, the predetermined distance being smaller than ½ of a width of the original lane.

8. The driving assistance device according to claim 1, wherein as the lateral movement operation, the operation control unit causes the own vehicle to operate so that an interval between the own vehicle and the object vehicle in an intersecting direction intersecting the destination lane is shorter than an interval between the own vehicle and the second boundary in the intersecting direction.

9. The driving assistance device according to claim 1, wherein:
   the first space determination unit determines that the passable space is present based on an interval between the own vehicle and the object vehicle in an intersecting direction intersecting the destination lane being equal to or greater than a first threshold distance; and
   as the lateral movement operation, the operation control unit causes the own vehicle to operate so that the interval between the own vehicle and the object vehicle in the intersecting direction intersecting the destination lane becomes a predetermined distance, the predetermined distance being shorter than the first threshold distance.

10. The driving assistance device according to claim 1, wherein:
    as the lateral movement operation, the operation control unit causes the own vehicle to travel parallel to the first boundary at a predetermined distance away from the first boundary in the original lane; and
    for a state in which the object vehicle is not present in the destination lane, the predetermined distance is set to be shorter than for a state in which the object vehicle is present in the destination lane.

11. The driving assistance device according to claim 1, further comprising a second space determination unit configured to determine that a movement candidate space of a predetermined size or more is present on a side of the destination lane when viewed from the own vehicle, wherein
    for a state in which it is detected that the own vehicle is scheduled to perform a lane change, it is determined that the passable space is present, and it is determined that the movement candidate space is present, the operation control unit causes the own vehicle to perform the lateral movement operation, and
    for a state in which it is detected that the own vehicle is scheduled to perform a lane change, it is determined that the passable space is present, and it is determined that the movement candidate space is not present, the operation control unit disables the own vehicle from performing the lateral movement operation.

12. The driving assistance device according to claim 1, wherein:
    the operation control unit determines that a preceding vehicle is present in a range of a predetermined distance or less in front of the own vehicle in the original lane; and
    for a state in which it is determined that the preceding vehicle is present in the range, as the lateral movement operation, the operation control unit causes the own vehicle to operate so that a front side of the own vehicle is closer to the destination lane than a rear side of the own vehicle is.

* * * * *